(12) United States Patent
Tachibanada et al.

(10) Patent No.: US 10,234,026 B2
(45) Date of Patent: Mar. 19, 2019

(54) AUTOMATIC TRANSMISSION

(71) Applicant: Honda Motor Co., Ltd., Tokyo (JP)

(72) Inventors: Yuya Tachibanada, Saitama (JP); Yutaka Ishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 15/458,997

(22) Filed: Mar. 15, 2017

(65) Prior Publication Data

US 2017/0268667 A1 Sep. 21, 2017

(30) Foreign Application Priority Data

Mar. 15, 2016 (JP) .................. 2016-051480

(51) Int. Cl.
*F16H 61/12* (2010.01)
*F16H 3/66* (2006.01)
*F16H 61/30* (2006.01)
*F16H 3/44* (2006.01)
*F16H 59/70* (2006.01)

(52) U.S. Cl.
CPC .............. *F16H 61/12* (2013.01); *F16H 3/66* (2013.01); *F16H 61/30* (2013.01); *F16H 2003/442* (2013.01); *F16H 2059/706* (2013.01); *F16H 2061/1256* (2013.01); *F16H 2200/0069* (2013.01); *F16H 2200/2012* (2013.01); *F16H 2200/2046* (2013.01); *F16H 2200/2048* (2013.01); *F16H 2200/2064* (2013.01); *F16H 2200/2066* (2013.01); *F16H 2200/2082* (2013.01); *F16H 2200/2094* (2013.01)

(58) Field of Classification Search
CPC .................. F16H 61/12; F16H 2061/1256
See application file for complete search history.

(56) References Cited

U.S. PATENT DOCUMENTS

| | | | |
|---|---|---|---|
| 9,221,455 B2* | 12/2015 | Ito ................ | B60K 6/445 |
| 2008/0215214 A1* | 9/2008 | Matsubara ........ | B60K 6/445 701/51 |
| 2014/0256508 A1* | 9/2014 | Ishikawa .......... | B60W 10/06 477/92 |

FOREIGN PATENT DOCUMENTS

JP  2015-169311  9/2015

* cited by examiner

*Primary Examiner* — Edwin A Young
(74) *Attorney, Agent, or Firm* — JCIPRNET

(57) ABSTRACT

An automatic transmission capable of properly judging faults of a switching mechanism is provided. A control part ECU of the automatic transmission TM has an actual change gear ratio calculating part 10 and a fault judging part 11. Under a condition that the control part ECU has recognized that the first brake device B1 is switched to a reverse rotation preventing state, if the actual change gear ratio is kept to be an actual change gear ratio prior to a reduction of a rotational speed of a drive source ENG when the rotational speed of the drive source ENG is reduced, then the fault judging part 11 judges that a first brake B1 has a fault.

4 Claims, 12 Drawing Sheets

| | B1 | B2 | B3 | B4 | C1 | C2 | C3 | Shifting ratio | Common ratio |
|---|---|---|---|---|---|---|---|---|---|
| Rvs | F | | ○ | | | ○ | | 4.008 | |
| 1st | R/F | ○ | ○ | | | | | 5.233 | |
| 2nd | R | ○ | ○ | | | | ○ | 3.367 | 1.554 |
| 3rd | R | ○ | ○ | | | ○ | | 2.298 | 1.465 |
| 4th | R | ○ | | | | ○ | ○ | 1.705 | 1.348 |
| 5th | R | ○ | | | ○ | ○ | | 1.363 | 1.251 |
| 6th | R | | | | ○ | ○ | ○ | 1.000 | 1.363 |
| 7th | R | | ○ | | ○ | ○ | | 0.786 | 1.273 |
| 8th | R | | ○ | | ○ | | ○ | 0.657 | 1.196 |
| 9th | R | | ○ | ○ | ○ | | | 0.584 | 1.126 |
| 10th | R | | | ○ | ○ | | ○ | 0.520 | 1.120 |

AUTOMATIC TRANSMISSION

CROSS-REFERENCE TO RELATED APPLICATION

This application claims the priority benefit of Japan application serial no. 2016-051480, filed on Mar. 15, 2016. The entirety of the above-mentioned patent application is hereby incorporated by reference herein and made a part of this specification.

BACKGROUND OF THE INVENTION

1. Field of the Invention

The present invention generally relates to an automatic transmission having a planetary gear mechanism and an engagement mechanism.

2. Description of Related Art

In the past, there is a known automatic transmission, having: a planetary gear mechanism, having a plurality of elements rotatable inside a casing; and a plurality of engagement mechanisms, switchable to a coupled state in which the elements are coupled to one another, or switchable to a fixed state in which the elements are fixed to the casing.

It is known that in such automatic transmission, as the engagement mechanism, an engagement mechanism allowing rotation (normal rotation) of the elements of the planetary gear in a prescribed direction and preventing the rotation (reverse rotation) in a direction opposite to the prescribed direction is used (for example, a one-way clutch) (for example referring to patent document 1).

Besides, in recent years, due to the demand of increasing gear positions, an automatic transmission using the following switching mechanism (for example, a two-way clutch) as the engagement mechanism is being developed. The switching mechanism is switchable between a reverse rotation preventing state allowing the normal rotation of elements of the planetary gear mechanism and preventing the reverse rotation and the fixed state. In such switching mechanism, switching is performed by a hydraulic pressure control circuit, etc.

EXISTING TECHNICAL DOCUMENTS

Patent Document

Patent document 1: Japanese Patent No. 2015-169311 gazette

SUMMARY OF THE INVENTION

[Problem to be Solved by the Invention]

In addition, in the conventional automatic transmission recorded in the patent document 1, by detecting a hydraulic pressure transmitted to a piston by a friction engagement mechanism, faults of the friction engagement mechanism are judged.

However, if such judging mechanism is applied to the fault judgment of the engagement mechanism (switching mechanism) which performs switching as the two-way clutch, then whether the faults are the switching mechanism per se cannot be judged.

The present invention is finished in view of the above problem, and aims to provide an automatic transmission capable of properly judging the faults of the switching mechanism.

[Technical Means Solving the Problem]

In order to achieve the objective, the automatic transmission of the present invention is an automatic transmission, including an input member disposed inside a casing and rotated by a driving force transmitted from a drive source; a planetary gear mechanism, having a plurality of elements rotatable inside the casing; a plurality of engagement mechanisms, switchable to a coupled state in which the elements are coupled to one another, or switchable to a fixed state in which the elements are fixed to the casing; an output member, outputting rotation; and a control part, controlling the engagement mechanisms and recognizing a rotational speed of the drive source. The automatic transmission is capable of outputting the rotation of the input member to the output member while changing speed in a plurality of gear positions with the planetary gear mechanism and the engagement mechanisms. The automatic transmission includes: an input rotational speed detector, detecting the rotational speed of the input member; and an output rotational speed detector, detecting a rotational speed of the output member; the plurality of engagement mechanisms include a switching mechanism switchable between a reverse rotation preventing state and the fixed state, the reverse rotation preventing state allows the normal rotation of a corresponding part in the plurality of elements and prevents the reverse rotation, the control part has an actual change gear ratio calculating part and a fault judging part, the actual change gear ratio calculating part calculates an actual change gear ratio based on the rotational speed of the input member and the rotational speed of the output member, and the fault judging part judges the faults of the switching mechanism. Under the condition that the control part recognizes that the switching mechanism has been switched to the reverse rotation preventing state, if the actual change gear ratio is kept to be the change gear ratio prior to the reduction of the rotational speed of the drive source when the rotational speed of the drive source is reduced, then the fault judging part judges that the switching mechanism has a fault.

In this way, in the automatic transmission of the present invention, under the condition that the control part recognizes that the switching mechanism has been switched to the reverse rotation preventing state, when the rotational speed of the drive source is reduced, whether the switching mechanism has a fault is judged.

If the switching mechanism does not have a fault, under the condition that the control part recognizes that the switching mechanism has been switched to the reverse rotation preventing state, the switching of the switching mechanism to the reverse rotation preventing state is performed normally, such that the switching mechanism is switched to the reverse rotation preventing state.

Besides, when the rotational speed of the drive force under such state is reduced, corresponding to the reduction of the rotational speed of the drive source, the rotational speed of the input member is also reduced. At this point, since the switching mechanism is in the reverse rotation preventing state (that is, the normal rotation of the corresponding part of the switching mechanism is allowed), therefore, the rotation of the corresponding part of the switching mechanism can be increased corresponding to the rotational speed of the input member. As a result, the rotational speed of the input member is not changed along with that of the input member in a linkage manner.

That is, if the switching mechanism does not generate a fault, then the rotational speed of the output member relative to the rotational speed of the input member (i.e., an actual change gear ratio) will be changed relative to the change gear ratio prior to the reduction of the rotational speed of the drive source.

Therefore, under the condition that the control part recognizes that the switching mechanism has been switched to the backward preventing state, when the rotational speed of the drive force is reduced, if the actual change gear ratio is changed, then the switching mechanism is judged to be normally switched and therefore, the switching mechanism does not generate a fault.

On the other aspect, if the switching mechanism generates a fault, then under the condition that the control part recognizes that the switching mechanism has been switched to the backward preventing state, the switching of the switching mechanism to the reverse rotation preventing state cannot be normally performed, such that the switching mechanism is kept at the fixed state.

Besides, when the rotational speed of the driving force under such state is reduced, by corresponding to the reduction of the rotational speed of the drive source, the rotational speed of the input member will also be reduced. At this point, since the switching mechanism is kept at the fixed state, the rotational speed of the corresponding part of such switching mechanism is still kept to be "0". As a result, the rotational speed of the output member and the rotational speed of the input member are reduced in a linkage manner.

That is, if the switching mechanism generates a fault, then the rotational speed of the output member relative to the rotational speed of the input member (i.e., an actual change gear ratio) will not be changed relative to the change gear ratio prior to the reduction e of the rotational speed of the drive source.

Therefore, under the condition that the control part recognizes that the switching mechanism has been switched to the backward preventing state, when the rotational speed of the drive force is reduced, if the actual change gear ratio is not changed, then the switching mechanism is judged to be not normally switched and therefore, the switching mechanism generates a fault.

Besides, in the automatic transmission of the present invention, preferably, the plurality of engagement mechanisms include a decoupling mechanism, the decoupling mechanism is switchable between the coupled state or fixed state of the corresponding part in the plurality of elements and a released state of releasing the coupled state or fixed state. The automatic transmission includes a hydraulic pressure control circuit switching the decoupling mechanism according to a provided hydraulic pressure, and the hydraulic pressure control circuit has a hydraulic pressure detector detecting the hydraulic pressure. The part corresponding to the switching mechanism is changed to a rotation state from the state of preventing the rotation when the gear position is shifted to a second gear position from a first gear position (1 gear). The decoupling mechanism is switched from one of the coupled state or fixed state and the released state to another of the same when the gear position is shifted to the second gear position (2 gear) from the first gear position (1 gear). If the hydraulic pressure is kept to be the hydraulic pressure corresponding another state of the decoupling mechanism for longer than a prescribed time and the actual change gear ratio is kept to be the change gear ratio of the first gear position (1 gear) when the gear position is shifted to the second gear position (2 gear) from the first gear position (1 gear), then the fault judging part judges whether the switching mechanism has a fault.

When the gear position is shifted to the second gear position from the first gear position, the element corresponding to the switching mechanism is changed to a rotation state from a state of preventing the rotation, and the decoupling mechanism is changed from one of the coupled state or fixed state and the released state to another of the same. Under such condition, if although the gear position is shifted to the second gear position from the first gear position, the change gear ratio is still kept to be change gear ratio corresponding to the first gear position, then the decoupling mechanism or the switching mechanism possibly has a fault.

In addition, the decoupling mechanism is different from the switching mechanism, and in order to keep a prescribed state, a prescribed hydraulic pressure corresponding to the state must be kept in a hydraulic pressure control circuit controlling the switching.

Therefore, if although the hydraulic pressure is kept to be the hydraulic pressure corresponding to the state after the decoupling mechanism is switched for longer than the prescribed time, the actual change gear ratio is still kept to be the change gear ratio corresponding to the first gear position, then it's a state that the decoupling mechanism is normally fastened and the possibility that the switching mechanism has a fault is high.

Besides, if whether it's such state is detected before the fault judgment of the switching mechanism, then whether the part having the fault is the switching mechanism can be easily learned.

Besides, in the automatic transmission of the present invention, the plurality of engagement mechanisms include a decoupling mechanism including a friction engagement mechanism, and the friction engagement mechanism is switchable between the coupled state or fixed state of the corresponding part in the plurality of elements and the released state releasing the coupled state or fixed state. The automatic transmission includes a temperature detector detecting a temperature of the decoupling mechanism. The part corresponding to the switching mechanism is changed to the rotation state from the state of preventing the rotation when the gear position is shifted to the second gear position (2 gear) from the first gear position (1 gear). The decoupling mechanism is switched between the coupled state or fixed state and the released state when the gear position is shifted to the second gear position (2 gear) from the first gear position (1 gear). If the temperature is kept to be the temperature corresponding to another state of the decoupling mechanism for more than the prescribed time and the actual change gear ratio is kept to be the change gear ratio of the first gear position (1 gear) when the gear position is shifted to the second gear position (2 gear) from the first gear position (1 gear), then the fault judging part judges whether the switching mechanism has a fault.

When the gear position is shifted to the second gear position from the first gear position, the element corresponding to the switching mechanism is changed to the rotation state from the state of preventing the rotation, and the decoupling mechanism is changed from one of the coupled state or fixed state and the released state to another of the same. Under such condition, if the gear position is shifted to the second gear position from the first gear position, but the change gear ratio is still kept to be the change gear ratio corresponding to the first change gear ratio, then the decoupling mechanism or switching mechanism possibly has a fault.

In addition, the decoupling mechanism including the friction engagement mechanism is different from the switching mechanism, and if the prescribed state is kept, then heat is generated by friction between the members, therefore, the temperature more than prescribed temperature corresponding to the state is kept.

Therefore, if the temperature is the temperature corresponding to the state after the decoupling mechanism is switched for more than prescribed speed, but the actual change gear ratio is still kept to be the change gear ratio corresponding to the first change gear ratio, then it's a state that the decoupling mechanism is normally fastened and the possibility that the switching mechanism has a fault is high.

Besides, if whether it's such state is detected before the fault judgment of the switching mechanism, then whether the part having the fault is the switching mechanism can be easily learned.

BRIEF DESCRIPTION OF THE DRAWINGS

FIG. 9A illustrates a condition that the two-way clutch is set into a fixed state, and FIG. 9B illustrates a condition that the two-way clutch is set into a reverse rotation preventing state.

FIG. 13A illustrates a condition that the two-way clutch does not generate a fault, and FIG. 13B illustrates a condition that the two-way clutch generates a fault.

DESCRIPTION OF THE EMBODIMENTS

Hereinafter, the automatic transmission of the present embodiment is explained with reference to drawings. The present embodiment is an embodiment of carrying the automatic transmission on a vehicle, but the automatic transmission of the present invention can also be carried on other traffic mediums such as a ship or a drone.

Figure 1:
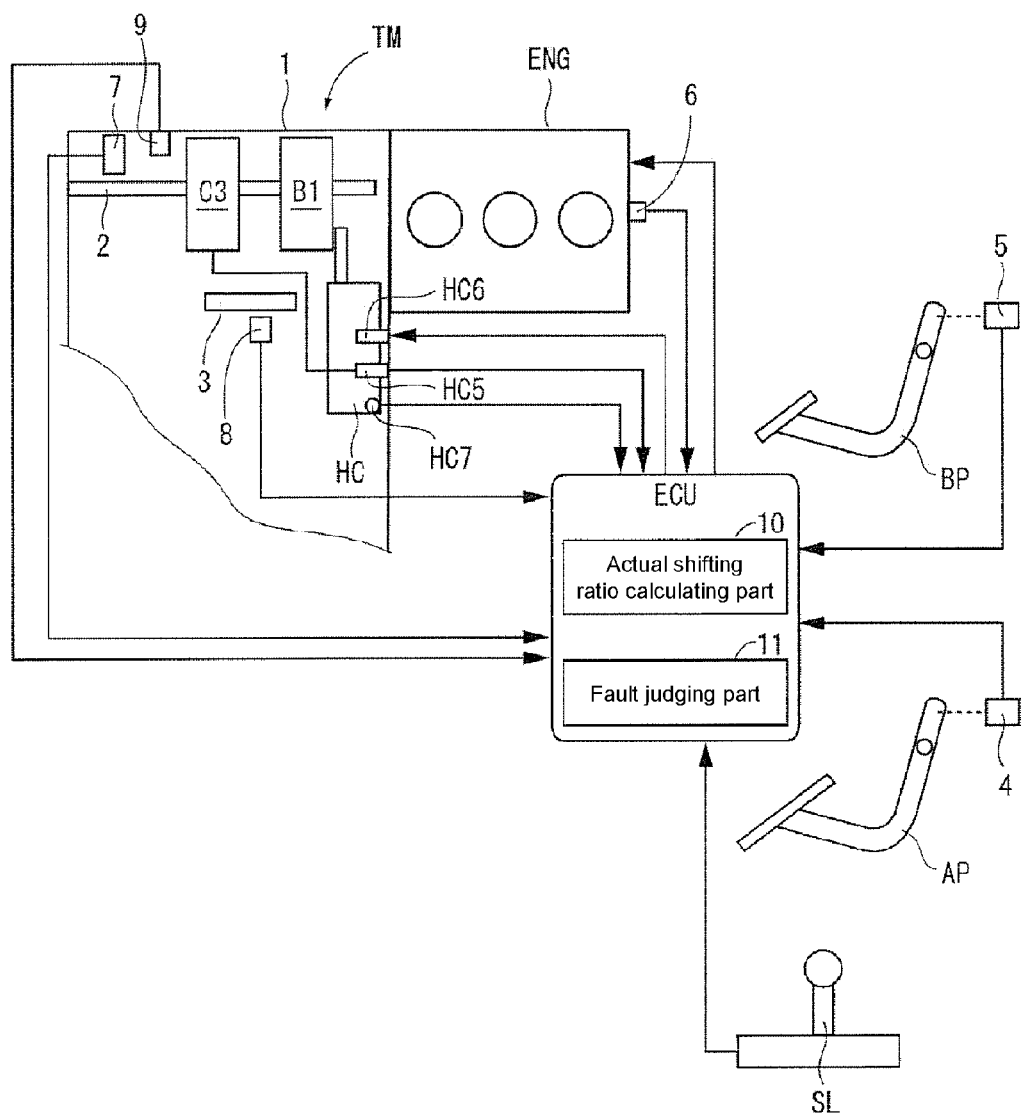
FIG. 1 is a schematic diagram illustrating constitution of an automatic transmission of the embodiment.

At first, a general constitution of the automatic transmission TM is explained with reference to FIGS. 1 and 2. FIG. 1 is a schematic diagram illustrating the constitution of the automatic transmission TM and FIG. 2 is a skeleton diagram of the automatic transmission TM.

As shown in FIG. 1, the automatic transmission TM includes: a transmission case 1 (casing); an input shaft 2 (input member), pivotally supported to be rotatable inside the transmission case 1; and an output gear 3 (output member), pivotally supported to be rotatable concentrically with the input shaft 2 inside the transmission case 1.

Besides, the vehicle carrying the automatic transmission TM includes a shift lever SL, freely switching a shift position (gear position) to any one of an advancing gear, a neutral range and a reverse gear; an accelerator opening detector 4, detecting ON/OFF of an accelerator pedal AP; and a brake pedal detector 5, detecting ON/OFF of a brake pedal.

Figure 2:
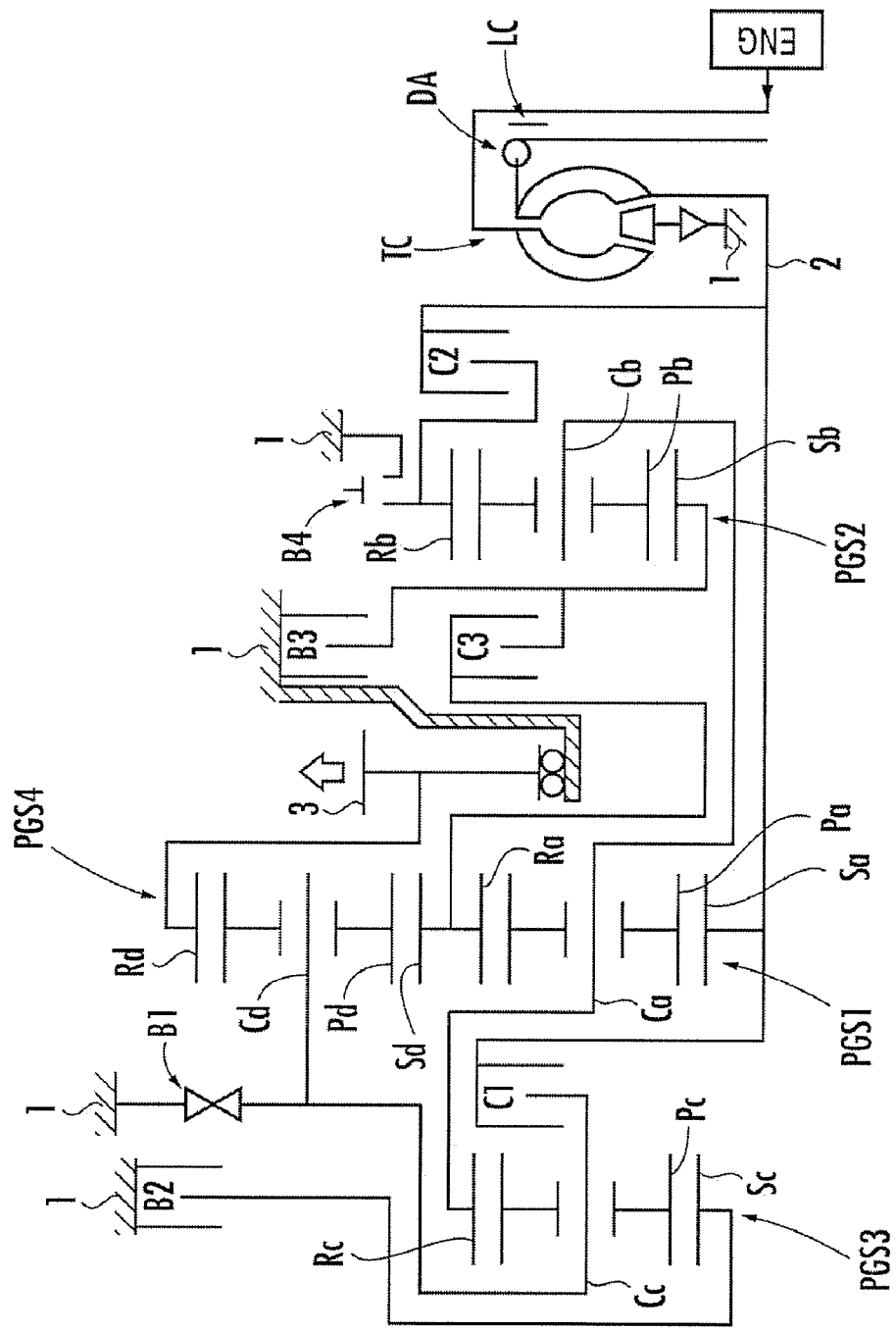
FIG. 2 is a skeleton diagram of a skeleton of the automatic transmission of FIG. 1.

As shown in FIG. 2, a drive force output from a drive source ENG such as an internal combustion engine (engine) is transmitted to the input shaft 2 through a torque converter TC. The torque converter TC has a lock up clutch LC and a damper DA. In addition, a single-plate or multi-plate starting clutch in free friction engagement constitution can be disposed instead of the torque converter TC.

Rotation of the output gear 3 is transmitted to left and right drive wheels of the vehicle through a differential gear (not shown) or propeller shaft (not shown).

In the transmission case 1, a first planetary gear mechanism PGS1, a second planetary gear mechanism PGS2, a third planetary gear mechanism PGS3 and a fourth planetary gear mechanism PGS4 which are concentric with the input shaft 2 are disposed in the transmission case 1.

Besides, in the transmission case 1, seven engagement mechanisms including a first clutch C1, a second clutch C2, a third clutch C3, a first brake B2, a third brake B3 and a fourth brake B4 are disposed.

Next, the four planetary gear mechanisms and seven engagement mechanisms of the automatic transmission TM are explained with reference to FIG. 3.

Figure 3:
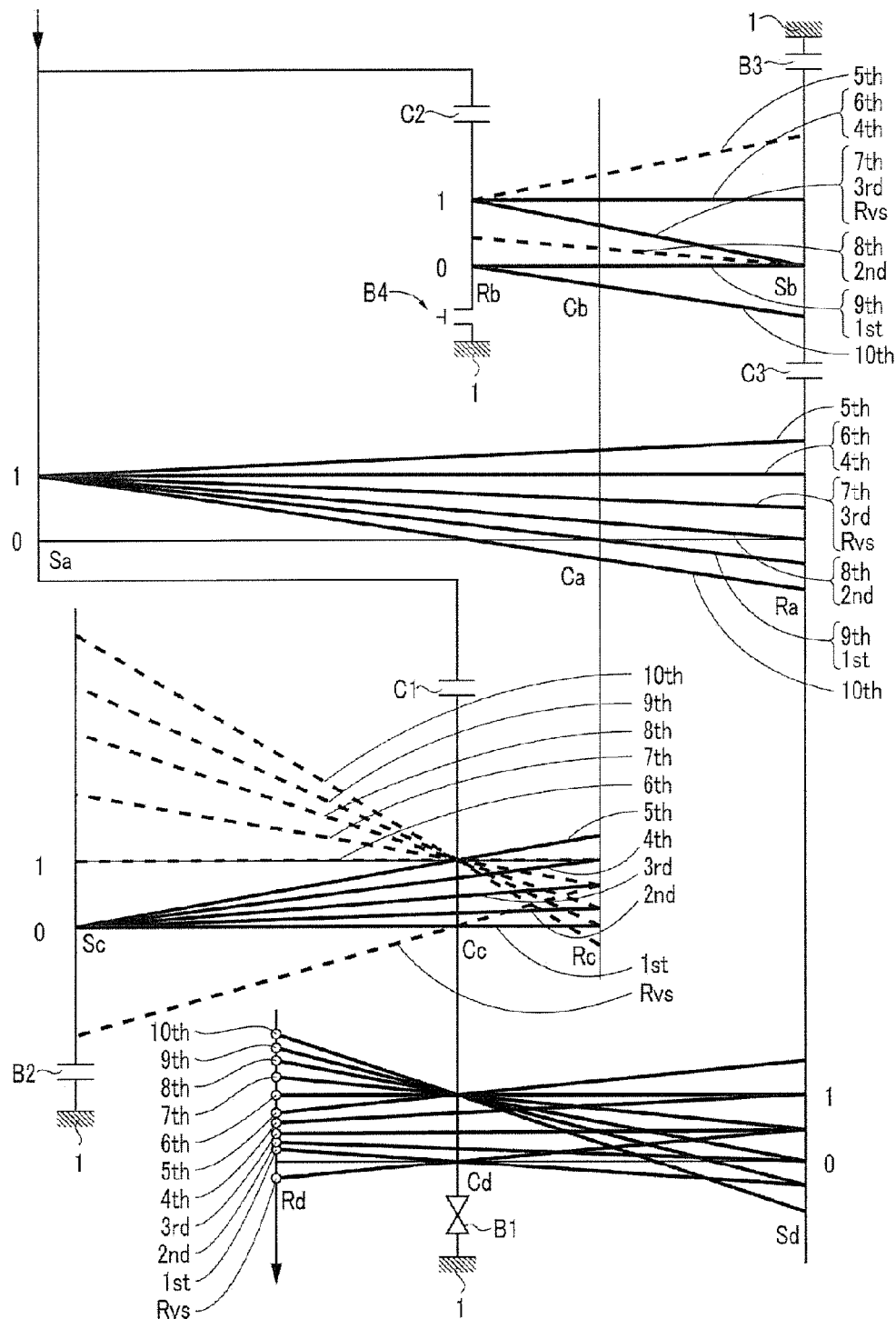
FIG. 3 is a nomogram of a planetary gear mechanism of the automatic transmission of FIG. 1.

In addition, the nomogram (a diagram capable of expressing a ratio of relative rotational speeds of three elements of the planetary gear mechanism with a straight line (speed line)) in FIG. 3 expresses the nomograms of the second planetary gear mechanism PGS2, the first planetary gear mechanism PGS1, the third planetary gear mechanism PGS3 and the fourth planetary gear mechanism PGS4 in sequence from the upper side.

The first planetary gear mechanism PGS1 includes a single pinion planetary gear mechanism, the single pinion planetary gear mechanism includes a sun gear Sa, a ring gear Ra and a gear carrier Ca, and the gear carrier Ca pivotally supports a pinion Pa meshed with the sun gear Sa and the inner ring gear Ra for free rotation and revolution.

In addition, in the single pinion planetary gear mechanism of the first planetary gear mechanism PGS1, when the gear carrier is fixed and the sun gear rotates, the inner ring gear rotates to a direction different from the sub gear, therefore, it is also-called as a minus planetary gear mechanism or negative planetary gear mechanism. Besides, in the planetary gear mechanism, when the ring gear is fixed and the sun gear rotates, the gear carrier rotates to a direction same as the sun gear.

As shown by the nomogram of the second paragraph from the upper side of FIG. 3, if the three elements Sa, Ca and Ra of the first planetary gear mechanism PGS1 are set into a first part, a second part and a third part from the left side (one of the sides) according to an arraying sequence under the interval corresponding to a change gear ratio (a tooth number of the inner ring gear/that of the sun gear) in the nomogram, then the first part is the sun gear Sa, the second part is the gear carrier Ca and the third part is the inner ring gear Ra.

When the change gear ratio of the first planetary gear mechanism PGS1 is h, a ratio of the interval between the sun gear Sa and the gear carrier Ca to that between the gear carrier Ca and the inner ring gear Ra is set to be h:1.

Similar to the first planetary gear mechanism PGS1, the second planetary gear mechanism PGS2 also includes the single pinion planetary gear mechanism, the single pinion planetary gear mechanism also includes a sun gear Sb, an inner ring gear Rb and a gear carrier Cb, and the gear carrier Cb pivotally supports a pinion Pb meshed with the sun gear Sb and the inner ring gear Rb for free rotation and revolution.

As shown by the nomogram of the first paragraph from the upper side of FIG. 3, if the three elements Sb, Cb and Rb of the second planetary gear mechanism PGS2 are set into a fourth element, a fifth element and a sixth element from the left side (one of the sides) according to an arraying sequence under the interval corresponding to a change gear ratio in the nomogram, then the fourth element is the sun gear Sb, the fifth element is the gear carrier Cb and the sixth element is the inner ring gear Rb.

When a change gear ratio of the second planetary gear mechanism PGS2 is set to be i, a ratio of the interval between the sun gear Sb and the gear carrier Cb to that between the gear carrier Cb and the inner ring gear Rb is set to be i:1.

Similar to the first planetary gear mechanism PGS1 and second planetary gear mechanism PGS2, the third planetary gear mechanism PGS3 also includes the so-called single pinion planetary gear mechanism, the single pinion planetary gear mechanism also includes a sun gear Sc, an inner ring gear Rc and a gear carrier Cc, and the gear carrier Cc pivotally supports a pinion Pc meshed with the sun gear Sc and the inner ring gear Rc for free rotation and revolution.

As shown by the nomogram of the third paragraph from the upper side of FIG. 3, if the three elements Sc, Cc and Rc of the third planetary gear mechanism PGS3 are set into a seventh element, an eighth element and a ninth element from the left side (one of the sides) according to an arraying sequence under the interval corresponding to a change gear ratio in the nomogram, then the seventh element is the sun gear Sc, the eighth element is the gear carrier Cc and the ninth element is the inner ring gear Rc.

When a change gear ratio of the third planetary gear mechanism PGS3 is set to be j, a ratio of the interval between the sun gear Sc and the gear carrier Cc to that between the gear carrier Cc and the inner ring gear Rc is set to be j:1.

Similar to the first planetary gear mechanism PGS1, the second planetary gear mechanism PGS2 and the third planetary gear mechanism PGS3, the fourth planetary gear mechanism PGS4 also includes the so-called single pinion planetary gear mechanism, the single pinion planetary gear mechanism also includes a sun gear Sd, an inner ring gear Rd and a gear carrier Cd, and the gear carrier Cd pivotally supports a pinion Pd meshed with the sun gear Sd and the inner ring gear Rd for free rotation and revolution.

As shown by the nomogram of the fourth paragraph (last paragraph) from the upper side of FIG. 3, if the three elements Sd, Cd and Rd of the fourth planetary gear mechanism PGS4 are set into a tenth element, an eleventh element and a twelfth element from the left side (one of the sides) according to an arraying sequence under the interval corresponding to a change gear ratio in the nomogram, then the tenth element is the inner ring gear Rd, the eleventh element is the gear carrier Cd and the twelfth element is the sun gear Sd.

When a change gear ratio of the fourth planetary gear mechanism PGS4 is set to be k, a ratio of the interval between the sun gear Sd and the gear carrier Cd to that between the gear carrier Cd and the inner ring gear Rd is set to be k:1.

The sun gear Sa (first element) of the first planetary gear mechanism PGS1 is connected to the input member (input member). Besides, the inner ring gear Rd (tenth element) of the fourth planetary gear mechanism PGS4 is connected to the output gear 3 (output member).

Besides, the gear carrier Ca (second element) of the first planetary gear mechanism PGS1, the gear carrier Cb (fifth element) of the second planetary gear mechanism PGS2 and the inner ring gear (ninth element) of the third planetary gear mechanism PGS3 are connected to constitute a first connector Ca-Cb-Rc. Besides, the inner ring gear Ra (third element) of the first planetary gear mechanism PGS1 and the sun gear Sd (twelfth element) of the fourth planetary gear mechanism PGS4 are connected to constitute a second connector Ra-Sd. Besides, the gear carrier Cc (eighth element) of the third planetary gear mechanism PGS3 and the gear carrier Cd (eleventh element) of the fourth planetary gear mechanism PGS4 are connected to constitute a third connector Cc-Cd.

The first clutch C1 is a hydraulically actuated wet multi-plate friction clutch. The first clutch C1 is constituted in a manner of being switchable between a coupled state of the sun gear Sa (first element) of the first planetary gear mechanism PGS1 and the third connector Cc-Cd and a released state of decoupling the connection.

The second clutch C2 is a hydraulically actuated wet multi-plate friction clutch. The second clutch C2 is constituted in a manner of being switchable between a coupled state of the sun gear Sa (first element) of the first planetary gear mechanism PGS1 and the inner ring gear Rb (fourth element) of the second planetary gear mechanism PGS2 and a released state of decoupling the connection.

The third clutch C3 is a hydraulically actuated wet multi-plate friction clutch. The third clutch C3 is constituted in a manner of being switchable between a coupled state of the sun gear Sb (second element) of the second planetary gear mechanism PGS2 and the second connector Ra-Sd and a released state of decoupling the connection.

The first brake B1 is a so-called two-way clutch. The first brake B1 is constituted in a manner of being switchable between the reverse rotation preventing state allowing the normal rotation (rotating to a direction same as a rotation direction of the input shaft 2) of the third connector Cc-Cd and preventing the reverse rotation and a fixed state that the third connector Cc-Cd is fixed on the transmission case 1.

Under the reverse rotation preventing state, the first brake B1 allows rotation when a rotation force to a normal rotation direction is applied to the connector Cc-Cd, and the first brake B1 prevents the rotation when a rotation force to a reverse rotation direction is applied, so as to fix the third connector Cc-Cd to the transmission case 1.

Besides, under the fixed state of the first brake B1, under any of the conditions of applying the rotation force to the normal rotation direction and the condition of applying the rotation force to the reverse rotation direction to the third connector Cc-Cd, the rotation is both prevented to fix the third connector Cc-Cd on the transmission case 1.

The second brake B2 is a hydraulically actuated wet multi-plate friction brake. The second brake B2 is constituted in a manner of being switchable between a fixed state that the sun gear Sc (seventh element) of the third planetary gear mechanism PGS3 is fixed on the transmission case 1 and a released state of removing the fixing.

The third brake B3 is a hydraulically actuated wet multi-plate friction brake. The third brake B3 is constituted in a manner of being switchable between a fixed state that the sun gear Sb (sixth element) of the second planetary gear mechanism PGS2 is fixed on the transmission case 1 and a released state of removing the fixing.

The fourth brake B4 is a meshing mechanism including a dog clutch or having a synchromesh mechanism with a synchronous function. The fourth brake B4 is constituted in a manner of being switchable between a fixed state that the inner ring gear Rb (fourth element) of the second planetary gear mechanism PGS2 is fixed on the transmission case 1 and a released state of removing the fixing.

The states of the first clutch C1, the second clutch C2, the third clutch C3, the first brake B1, the second brake B2, the third brake B3 and the fourth brake B4 are switched based on vehicle information of a driving speed of the vehicles by a control element ECU including a transmission control unit.

As shown in FIG. 2, on an axis of the input shaft 2, from the side of the torque converter TC of the drive force ENG, the second clutch C2, the second planetary gear mechanism PGS2, the third clutch C3, the output gear 3, the first planetary gear mechanism PGS1, the first clutch C1 and the third planetary gear mechanism PGS3 are configured in sequence.

The fourth brake B4 is configured on a radial outside of the second planetary gear mechanism PGS2, the third brake B3 is configured on a radial outside of the third clutch C3, the first brake B1 is configured on a radial outside of the first clutch C1 and the second brake B2 is configured on a radial outside of the third planetary gear mechanism PGS3.

In this way, in the automatic transmission TM, the four brakes are configured on a radial outside of the planetary gear mechanisms or clutches, therefore, compared with an automatic transmission that the brakes and the planetary gear mechanisms are arrayed and configured on the axis of the input shaft 2 together, the axis of the automatic transmission is shortened. In addition, the fourth brake B4 is configured on a radial outside of the second clutch C2, and the third brake B3 is configured on a radial outside of the second planetary gear mechanism PGS2.

Besides, the fourth planetary gear mechanism PGS4 is configured on a radial outside of the first planetary gear mechanism PGS1. Besides, the inner ring gear Ra (third element) of the first planetary gear mechanism PGS1 and the sun gear Sd (twelfth element) of the fourth planetary gear mechanism PGS4 are integrally connected to form the second connector Ra-Sd.

In this way, in the automatic transmission TM, the fourth planetary gear mechanism PGS4 is configured on a radial outside of the first planetary gear mechanism PGS1, therefore, the first planetary gear mechanism PGS1 and the fourth planetary gear mechanism PGS4 are coincided in a radial direction, therefore, the axis of the automatic transmission is shortened.

In addition, the axis can be shortened as long as the first planetary gear mechanism PGS1 and the fourth planetary gear mechanism PGS4 are at least partially coincided in the radial direction, but if the two are totally coincided in the radial direction, then the axis is the shortest.

Next, the states of the engagement mechanisms (i.e., the first clutch C1, the second clutch C2, the third clutch C3, the first brake B1, the second brake B2, the third brake B3 and the fourth brake B4) when various gear positions are determined in the automatic transmission TM are explained with reference to FIGS. 3 and 4.

In addition, in the nomogram of FIG. 3, the lower transverse line and the upper lower transverse line (for example, in the first planetary gear mechanism PGS1 from the second paragraph of the upper side of FIG. 3, the lines coincided with the nomogram 4th and nomogram 6th) represent the rotational speed "0" and "1" (the rotational speeds same as the input shaft as the input member).

Besides, in the nomogram of FIG. 3, the speed lines as shown in virtual lines represent: each element of other planetary gear mechanisms rotates (idly) by following the planetary gear mechanism transmitting power in the first planetary gear mechanism PGS1, the second planetary gear mechanism PGS2, the third planetary gear mechanism PGS3 and the fourth planetary gear mechanism PGS4.

Figures 4, 5:
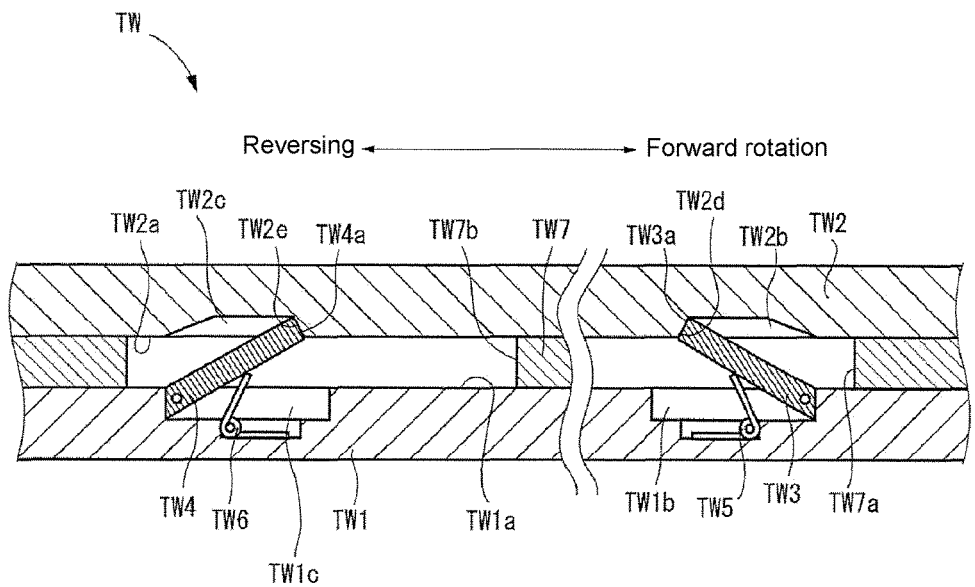
FIG. 4 is an explanatory drawing illustrating the state of an engagement mechanism in various gear positions of the automatic transmission of FIG. 1.
FIG. 5 is a sectional view of a fixed state of a two-way clutch of the automatic transmission of FIG. 1.

Besides, the chart in FIG. 4 is a diagram illustrating a state summary of the engagement mechanisms under each gear position, "○" represents that the engagement mechanism of the corresponding column is in a coupled state or fixed state, and a blank column represents that the engagement mechanism of the corresponding column is in a released state.

Besides, in the chart of FIG. 4, the "R" of the column of the first brake B1 represents that the first brake B1 is in the reverse rotation preventing state, and "F" of such column represents that the first brake B1 is in the fixed state.

Besides, in the chart of FIG. 4, the underlined "R" represents that when the first brake B1 works, the rotational speed of the sun gear (seventh element) of the sun gear Sc of the third connector Cc-Cd or the third planetary gear mechanism PGS3 is 0. Besides, "RIF" represents that the reverse rotation preventing state "R" under the normal condition is switched to the "F" of the fixed state or normal rotation preventing state under a condition that the brake of an engine plays a role.

As shown in FIG. 4, in the automatic transmission TM, when the 1 gear is determined, the first brake B1 as the two-way clutch is set into the reverse rotation preventing state, and the second brake B2 and the third brake B3 are set into a fixed state.

By setting the first brake B1 into the reverse rotation preventing state, the reverse rotation of the sun gear Sc (seventh element) of the third connector Cc-Cd and the third planetary gear mechanism PGS3 is prevented, and the rotational speed of the sun gear Sc (seventh element) of the third connector Cc-Cd and the third planetary gear mechanism PGS3 is changed to "0". Besides, the sun gear Sc (seventh element) of the third planetary gear mechanism PGS3 and the inner ring gear (ninth element) of the gear carrier Cc (eighth element) are changed into a state of locking relative rotation, and the rotational speed of the first connector Ca-Cb-Rc including the inner ring gear Rc (ninth element) of the third planetary gear mechanism PGS3 is also changed to "0".

Therefore, the rotational speed of the inner ring gear Rd (tenth element) of the fourth planetary gear mechanism PGS4 connected to the output gear 3 is changed to "1st" as shown in FIG. 3, and the first gear is determined. If the brake of the engine is caused to play a role under the first gear, only the first brake B1 needs to be switched to the fixed state.

In addition, there is no need to set the third brake B3 into the fixed state in order to determine the 1 gear. However, the third brake B3 is set into the fixed state in the first gear to smoothly shift to the second gear described below.

When the second gear is determined, the first brake B1 as the two-way clutch is set into the reverse rotation preventing state, the second brake B2 and the third brake B3 are set into the fixed state, and the third brake B3 is set into the coupled state.

By setting the first brake B1 into the backward preventing state, the third connector Cc-Cd is allowed to normal rotate. Besides, by setting the second brake B2 into the fixed state, the rotational speed of the sun gear Sc (seventh element) of the third planetary gear mechanism PGS3 is changed to "0". Besides, by setting the third brake B3 into the fixed state, the rotational speed of the sun gear Sb (sixth element) of the second planetary gear mechanism PGS2 is changed to "0".

Besides, by setting the third brake B3 into the coupled state, the rotational speed of the second connector Ra-Sd and the rotational speed of the sun gear Sb (sixth element) of the second planetary gear mechanism PGS2 are changed to "0".

Therefore, the rotational speed of the inner ring gear Rd (tenth element) of the fourth planetary gear mechanism PGS4 connected to the output gear 3 is changed to "2nd" as shown in FIG. 3 and the second gear is determined.

When a third gear is determined, the first brake B1 as the two-way clutch is set into the reverse rotation preventing state, and the second brake B2 and the third brake B3 are set into the fixed state, and the second clutch C2 is set into the coupled state.

By setting the first brake B1 into the reverse rotation preventing state, the normal rotation of the third connector Cc-Cd is allowed. Besides, by setting the second brake B2 into the fixed state, the rotational speed of the sun gear Sc (seventh element) of the third planetary gear mechanism PGS3 is changed to "0". Besides, by setting the third brake B3 into the fixed state, the rotational speed of the sun gear Sb (sixth element) of the second planetary gear mechanism PGS2 is changed to "0".

Besides, by setting the second clutch C2 into the coupled state, such that a rotational speed of the inner ring gear Rb (fourth element) of the second planetary gear mechanism PGS2 is changed to a speed same as the rotational speed of the sun gear (first element) of the first planetary gear mechanism PGS1 connected to the input shaft 2, i.e., "1". The rotational speed of the sun gear Sb (sixth element) of the second planetary gear mechanism PGS2 is changed to "0", the rotational speed of the inner ring gear Rb (fourth element) is changed to "1", therefore, the rotational speed of the gear carrier Cb (fifth element), that is, the rotational speed of the first connector Ca-Cb-Rc is changed to i/i+1.

Therefore, the rotational speed of the inner ring gear Rd (tenth element) of the fourth planetary gear mechanism PGS4 connected to the output gear 3 is changed to "3rd" as shown in FIG. 3, and the 3 gear is determined.

When a 4 gear is determined, the first brake B1 as the two-way clutch is set into the reverse rotation preventing state, the second brake B2 is set into the fixed state and the second clutch C2 and the third clutch C3 are set into the coupled state.

By setting the first brake B1 into the reverse rotation preventing state, the normal rotation of the third connector Cc-Cd is allowed. Besides, by setting the second brake B2 into the fixed state, the rotational speed of the sun gear (seventh element) of the third planetary gear mechanism PGS3 is changed to "0".

Besides, by setting the third clutch C3 into the coupled state, the sun gear Sb (sixth element) of the second planetary gear mechanism PGS2 and the second connector Ra-Sd rotate at the same speed. At this point, between the first planetary gear mechanism PGS1 and the second planetary gear mechanism PGS2, the gear carrier Ca (second element) is connected to the gear carrier Cb (fifth element), and the inner ring gear Ra (third element) and the sun gear Sb (sixth element) are connected. Therefore, in the 4 gear of setting the third clutch C3 into the coupled state, the first planetary gear mechanism PGS1 and the second planetary gear mechanism PGS2 are used to describe a nomogram including four elements.

Besides, by setting the second clutch C2 into the coupled state, the rotational speed of the inner ring gear Rb (fourth element) of the second planetary gear mechanism PGS2 is changed to the same as the rotational speed, i.e., "1", of the sun gear Sa (first element) of the first planetary gear mechanism PGS1, and the rotational speeds of two of four elements consisting of the first planetary gear mechanism PGS1 and the second planetary gear mechanism PGS2 are changed to the same speed, i.e., "1". Therefore, each element of the first planetary gear mechanism PGS1 and the second planetary gear mechanism PGS2 is changed into the locking state and unable to rotate relatively, and the rotational speeds of all elements of the first planetary gear mechanism PGS1 and the second planetary gear mechanism PGS2 are changed to "1".

Therefore, the rotational speed of the third Cc-Cd is changed to j/(j+1), the rotational speed of the inner ring gear Rd (tenth element) of the fourth planetary gear mechanism PGS4 connected to the output gear 3 is changed to "4th" as shown in FIG. 4, and the 4 gear is determined.

When a 5 gear is determined, the first brake B1 as the two-way clutch is set into the reverse rotation preventing state, the second brake B2 is set into the fixed state and the first clutch C1 and the second clutch C2 are set into the coupled state.

By setting the first brake B1 into the reverse rotation preventing state, the normal rotation of the third connector Cc-Cd is allowed. Besides, by setting the second brake B2 into the fixed state, the rotational speed of the sun gear (seventh element) of the third planetary gear mechanism PGS3 is changed to "0".

Besides, by setting the first clutch C1 into the coupled state, the rotational speed of the third connector Cc-Cd is changed to the speed same as the rotational speed, i.e., 1, of the sun gear Sa (first element) of the first planetary gear mechanism PGS1.

Therefore, the inner ring gear Rd (tenth element) of the fourth planetary gear mechanism PGS4 connected to the output gear 3 is changed to "5th" as shown in FIG. 3 and the 5 gear is determined.

In addition, there is no need to set the second clutch C2 into the coupled state in order to determine the 5 gear. But the second clutch C2 needs to be set into the coupled state in the 4 gear and 6 gear, therefore, the coupled state is set in the 5 gear such that down shift from the 5 gear to the 4 gear and up shift from the 5 gear to a 6 gear described below can be smoothly performed.

When the 6 gear is determined, the first brake B1 as the two-way clutch is set into the reverse rotation preventing state, and the first clutch C1, the second clutch C2 and the third clutch C3 are set into the coupled state.

By setting the first brake B1 into the reverse rotation preventing state, the normal rotation of the third connector Cc-Cd is allowed.

Besides, by setting the second clutch C2 and the third clutch C3 into the coupled state, as explained in the 4 gear, each element of the first planetary gear mechanism PGS1 and the second planetary gear mechanism PGS2 is changed to the locking state and unable to rotate relatively, and the rotational speed of the second connector Ra-Sd is changed to "1". Besides, by setting the first clutch C1 into the coupled state, the rotational speed of the third connector Cc-Cd is changed to "1". Therefore, in the fourth planetary gear mechanism PGS4, the gear carrier Cd (eleventh element) and the sun gear Sd (twelfth element) are changed to the same speed "1", and each element is changed to a locking state and unable to rotate relatively.

Therefore, the inner ring gear Rd (tenth element) of the fourth planetary gear mechanism PGS4 connected to the output gear 3 is changed to "6th" as shown in FIG. 3 and the 6 gear is determined.

When a 7 gear is determined, the first brake B1 as the two-way clutch is set into the reverse rotation preventing state, the third brake B3 is set into the fixed state, and the first clutch C1 and the second clutch C2 are set into the coupled state.

By setting the first brake B1 into the reverse rotation preventing state, the normal rotation of the third connector Cc-Cd is allowed. Besides, by setting the third brake B3 into the fixed state, the rotational speed of the sun gear Sb (sixth element) of the second planetary gear mechanism PGS2 is changed to "0".

Besides, by setting the second clutch C2 into the coupled state, the rotational speed of the inner ring gear Rb (fourth element) of the second planetary gear mechanism PGS2 is changed to a speed same as the rotational speed, i.e., "1", of the sun gear Sa (first element) of the first planetary gear mechanism PGS1, and the rotational speed of the first connector Ca-Cb-Re including the gear carrier Cb (fifth element) of the second planetary gear mechanism PGS2 is changed to (i/i+1). Besides, by setting the first clutch C1 into the coupled state, the rotational speed of the third connector Cc-Cd is changed to a speed same as the rotational speed, i.e., "1", of the sun gear Sa (first element) of the first planetary gear mechanism PGS1.

Therefore, the inner ring gear Rd (tenth element) of the fourth planetary gear mechanism PGS4 connected to the output gear 3 is changed to "7th" as shown in FIG. 3 and the 7 gear is determined.

When a 8 gear is determined, the first brake B1 as the two-way clutch is set into the reverse rotation preventing state, the third brake B3 is set into the fixed state, and the first clutch C1 and the third clutch C3 are set into the coupled state.

By setting the first brake B1 into the reverse rotation preventing state, the normal rotation of the third connector Cc-Cd is allowed. By setting the third brake B3 into the fixed state, the sun gear Sb (sixth element) of the second planetary gear mechanism PGS2 is changed to "0".

Besides, by setting the third clutch C3 into the coupled state, the rotational speed of the second connector Ra-Sd is changed to the speed same as the rotational speed, i.e., "0", of the sun gear Sb (sixth element) of the second planetary gear mechanism PGS2. Besides, by setting the first clutch C1 into the coupled state, the rotational speed of the third connector Cc-Cd is changed to a speed same as the rotational speed, "1", of the sun gear Sa (first element) of the first planetary gear mechanism PGS1.

Therefore, the inner ring gear Rd (tenth element) of the fourth planetary gear mechanism PGS4 connected to the output gear 3 is changed to "8th" as shown in FIG. 3 and the 8 gear is determined.

When a 9 gear is determined, the first brake B1 as the two-way clutch is set into the reverse rotation preventing state, the third brake B3 and the fourth brake B4 are set into a fixed state, and the first clutch C1 is set into the coupled state.

By setting the first brake B1 into the reverse rotation preventing state, the normal rotation of the third connector Cc-Cd is allowed. Besides, by setting the third brake B3 into the fixed state, the rotational speed of the sun gear Sb (sixth element) of the second planetary gear mechanism PGS2 is changed to "0". Besides, by setting the fourth brake B4 into the fixed state, the inner ring gear Rb (fourth element) of the second planetary gear mechanism PGS2 is also changed to "0". Therefore, each of the Sb, Cb and Rb of the second planetary gear mechanism PGS2 is not changed to the locking state and unable to rotate relatively, and the rotational speed of the first connector Ca-Cb-Rc including the gear carrier Cb (fifth element) of the second planetary gear mechanism PGS2 is changed to "0".

Besides, by setting the first clutch C1 into the coupled state, the rotational speed of the third connector Cc-Cd is changed to a speed same as the rotational speed, i.e., "1", of the sun gear Sa (first element) of the first planetary gear mechanism PGS1.

Therefore, the rotational speed of the inner ring gear Rd of the fourth planetary gear mechanism PGS4 connected to the output gear 3 is changed to "9th" as shown in FIG. 3 and the 9 gear is determined.

When a 10 gear is determined, the first brake B1 as the two-way clutch is set into the reverse rotation preventing state, the fourth brake B4 is set into the fixed state, and the first clutch C1 and the third clutch C3 are set into the coupled state.

By setting the first brake B1 into the reverse rotation preventing state, the normal rotation of the third connector Cc-Cd is allowed. Besides, by setting the fourth brake B4 into the fixed state, the inner ring gear Rb (fourth element) of the second planetary gear mechanism PGS2 is changed to "0".

Besides, by setting the third clutch C3 into the coupled state, the second connector Ra-Sd and the sun gear Sb (sixth element) of the second planetary gear mechanism PGS2 rotate at the same speed. Besides, by setting the first clutch C1 into the coupled state, the rotational speed of the third connector Cc-Cd is changed to a speed same as the rotational speed, i.e., "1", of the sun gear Sa (first element) of the first planetary gear mechanism PGS1.

Therefore, the inner ring gear Rd (tenth element) of the fourth planetary gear mechanism PGS4 connected to the output gear 3 is changed to "10th" as shown in FIG. 3 and the 10 gear is determined.

When a reverse gear is determined, the first brake B1 and the third brake B3 as the two-way clutch are set into the fixed state, and the second clutch C2 is set into the coupled state.

By setting the first brake B1 into the fixed state, such that the rotational speed of the third connector Cc-Cd is changed to "0". Besides, by setting the third brake B3 into the fixed state and the second clutch C2 into the coupled state, the rotational speed of the first connector Ca-Cb-Rc is changed to i/i+1.

Therefore, the inner ring gear Rd (tenth element) of the fourth planetary gear mechanism PGS4 connected to the output gear 3 is changed to reverse i.e., "Rvs" as shown in FIG. 3 and the reverse gear is determined.

Besides, FIG. 4 also shows change gear ratios (rotational speed of the input shaft 2/rotational speed of the output gear 3) and common ratios (which are ratios of the change gear ratios among the gear positions and are values obtained by dividing the change gear ratio corresponding to the prescribed gear position by the change gear ratio corresponding to a high speed side gear position higher than the prescribed change gear ratio by one gear) corresponding to all gear positions when a change gear ratio h of the first planetary gear mechanism PGS1 is 2.734, a change gear ratio i of the second planetary gear mechanism PGS2 is 1.614, a change gear ratio j of the third planetary gear mechanism PGS3 is 2.681 and a change gear ratio k of the fourth planetary gear mechanism PGS4 is 1.914, and accordingly, it can be known that the common ratio can be properly set.

Next, one example of the two-way clutch as the first brake B1 (switching mechanism) in the automatic transmission TM is explained with reference FIGS. 5-8.

The first brake B1 includes a two-way clutch, and the two-way clutch is switchable between the fixed state that the third connector Cc-Cd is fixed on the transmission case 1 and the reverse rotation preventing state allowing the normal rotation and preventing reverse rotation of the third connector Cc-Cd. As the two-way clutch, for example, the two-way clutch TW constituted as shown in FIGS. 5-8 is used.

Figure 6:
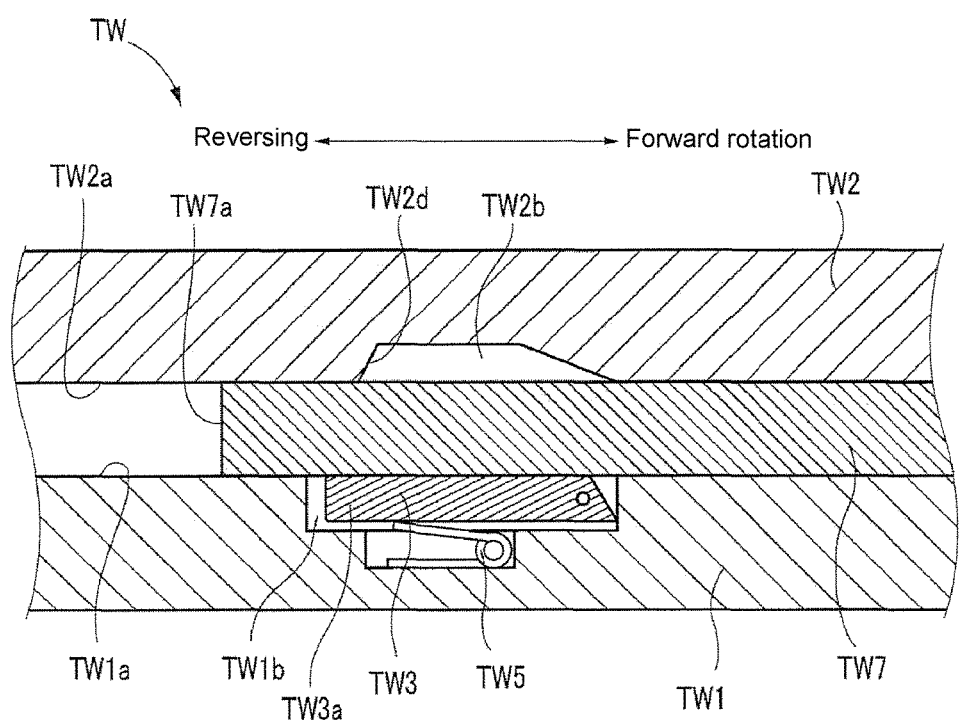
FIG. 6 is a sectional view of a reverse rotation preventing state of a main part of the two-way clutch of the automatic transmission of FIG. 1.

As shown by a section in FIGS. 5 and 6, the two-way clutch has: a fixing plate TW1 fixed on the transmission case 1 and a rotating plate TW2 connected to the third connector Cc-Cd.

Figure 7:
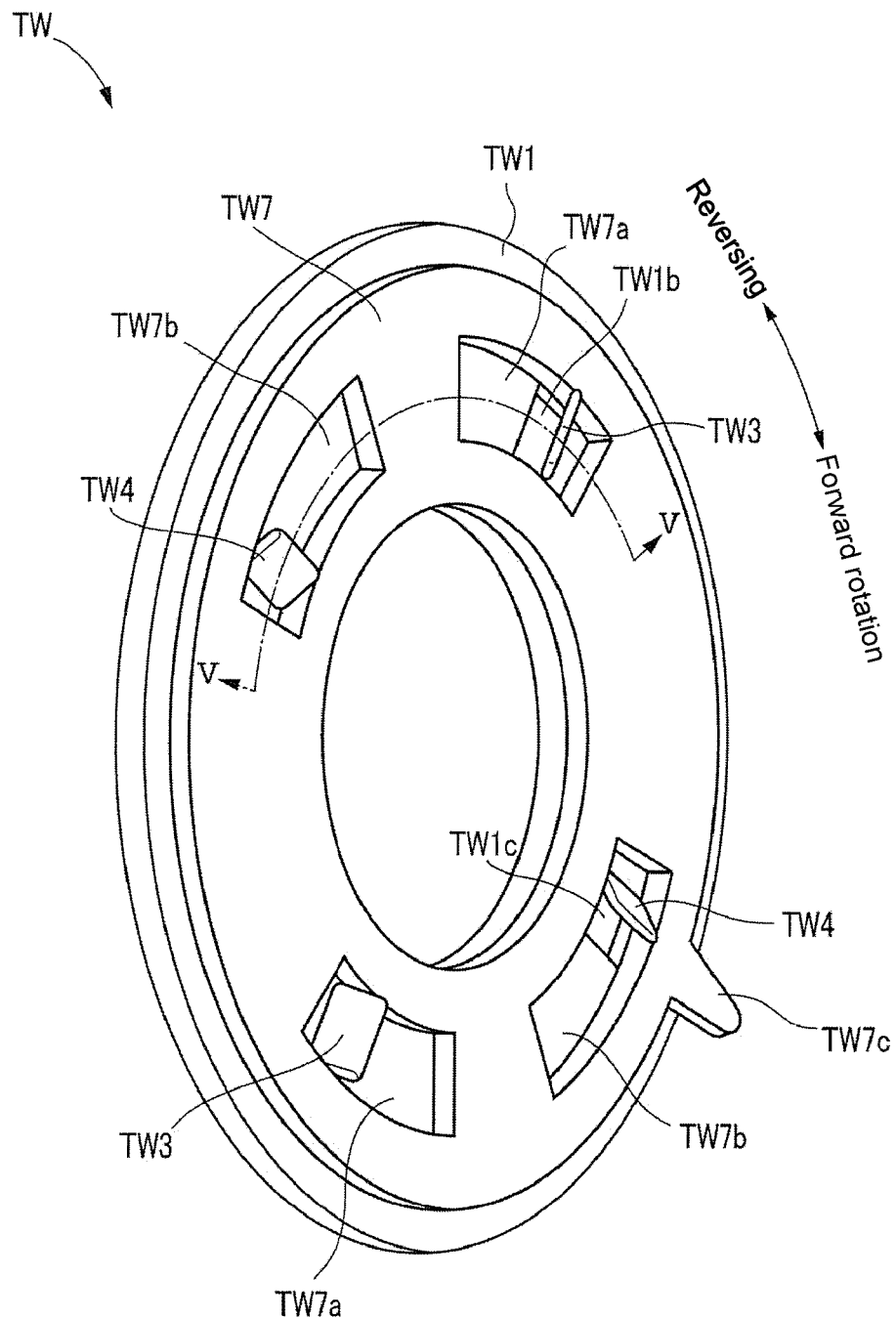
FIG. 7 is a stereoscopic diagram of a fixed state of the two-way clutch of the automatic transmission of FIG. 1.
Figure 8:
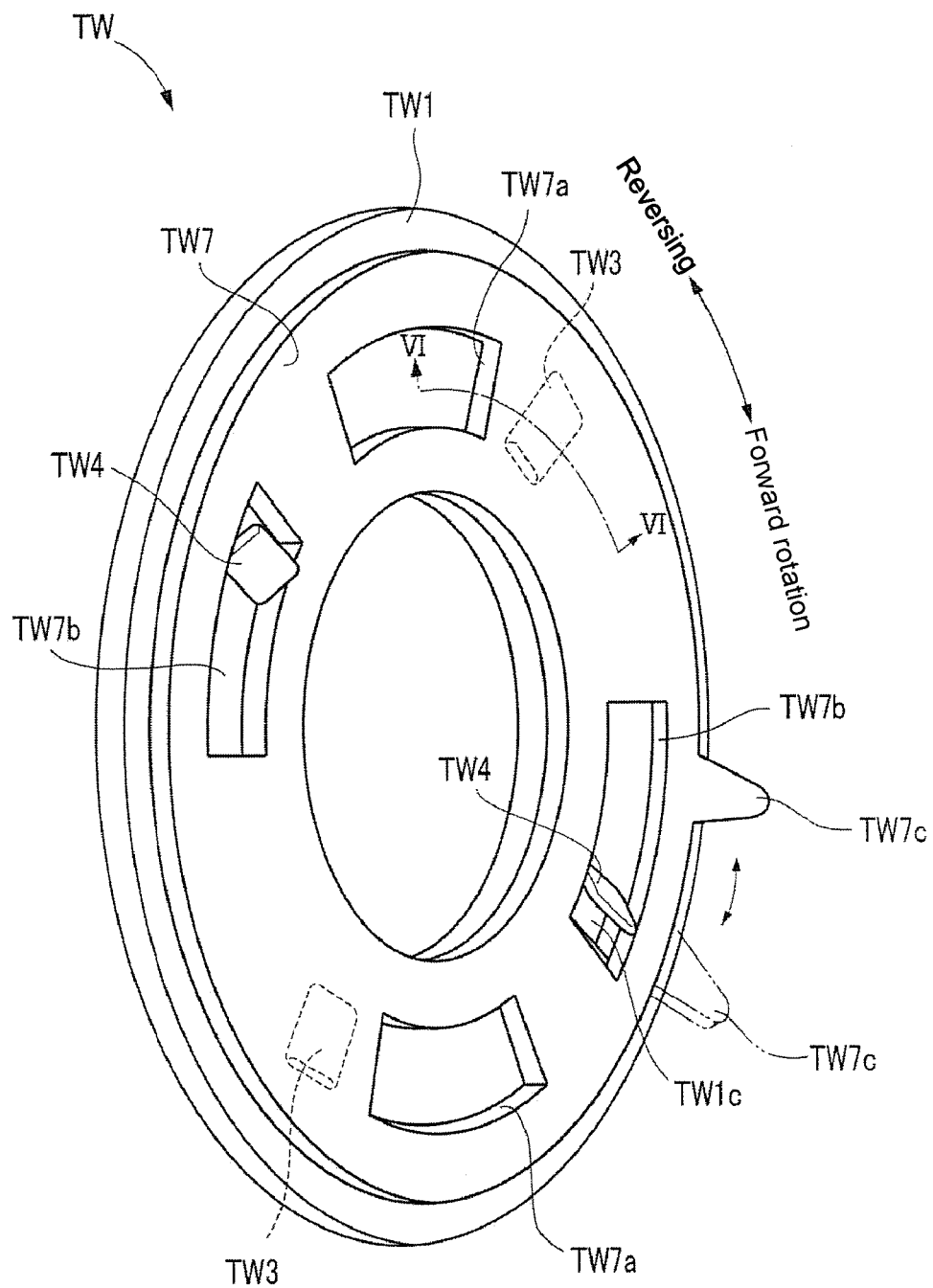
FIG. 8 is a stereoscopic diagram of a reverse rotation preventing state of the two-way clutch of the automatic transmission of FIG. 1.

As shown in FIGS. 7 and 8, the fixing plate TW1 is doughnuts-shaped. Besides, although omitted in FIGS. 7 and 8, the rotating plate TW2 similar to the fixing plate TW1 is also doughnuts-shaped. The fixing plate TW1 and the rotating plate TW2 are concentrically disposed.

As shown in FIG. 5, on a lateral surface TW1a of the fixing plate TW1 opposite to the rotating plate TW2, a first containing part TW1B and a second containing part TW1C as dents are formed. A platy normal rotation preventing member TW3 is disposed in the first containing part TW1b in a containing manner. A platy reverse rotation preventing member TW4 is disposed in the second containing part TW1c in a containing manner.

The end in the other side (reverse rotation direction of the rotating plate TW2) in a circumferential direction of the normal rotation preventing member TW3 becomes a swing end part TW3a. The swing end part TW3a can swing by taking the end (the normal rotation direction of the rotating plate TW2) in one side of the circumferential direction of the fixing plate TW1 as an axis.

The end in the other side (normal rotation direction of the rotating plate TW2) in a circumferential direction of the reverse rotation preventing member TW4 becomes a swing end part TW4a. The swing end part TW4a can swing by taking the end (the reverse rotation direction of the rotating plate TW2) in the other side of the circumferential direction of the fixing plate TW1 as an axis.

Between the bottom surface of the first containing part TW1b and the normal rotation preventing member TW3, a first spring TW5 is disposed. The first spring TW5 applies a force to the swing end part TW3a of the normal rotation preventing member TW3 so as to protrude the swing end part TW3a from the first containing part TW1b.

Between the bottom surface of the second containing part TW1G and the reverse rotation preventing member TW4, a second spring TW6 is disposed. The second spring TW6 applies a force to the swing end part TW4a of the reverse rotation preventing member TW4 so as to protrude the swing end part TW4a from the second containing part TW1c.

On the lateral surface TW2a of the rotating plate TW2 opposite to the fixing plate TW1, a position corresponding to the normal rotation preventing member TW3 is provided with a first dent TW2b. Besides, on the lateral surface of the rotating plate, a position corresponding to the reverse rotation preventing member TW4 is provided with a second dent TW2c.

On the other side (reverse rotation direction side) of the circumferential direction of the rotating plate TW2 of the first dent TW2b, a first engagement part TW2d is disposed. The first engagement part TW2d forms a step shape capable of being engaged with the swing end part TW3a of the normal rotation preventing member TW3.

On one side (normal rotation direction side) of the circumferential direction of the rotating plate TW2 of the second dent TW2c, a second engagement part TW2e is disposed. The second engagement part TW2e forms a step shape capable of being engaged with the swing end part TW4a of the reverse rotation preventing member TW4.

As shown in FIGS. 5 and 7, when the swing end part TW3a of the normal rotation preventing member TW3 and the first engagement part TW2d are in a state able to be engaged, and the swing end part TW4a of the reverse rotation preventing member TW4 and the second engagement part TW2e are in a state able to be engaged, the normal rotation and reverse rotation of the rotating plate TW2 are both prevented.

Therefore, the state that the swing end part TW3a and the swing end TW4a and the first engagement part TW2d and the second engagement part TW2e corresponding to the swing end part TW3a and the swing end TW4a are engaged with each other becomes the fixed state in the two-way clutch TW.

Between the fixing plate TW1 and the rotating plate TW2, a switching plate TW7 is clipped. As shown in FIGS. 7 and 8, the switching plate TW7 is also doughnuts-shaped. On the switching plate TW7, a position corresponding to the normal rotation preventing member TW3 and the reverse rotation preventing member TW4 is provided with a first punching hole TW7a and a second punching hole TW7b.

On the outer edge of the switching plate TW7, a protrusion TW7c that protrudes to the lateral outside is disposed. As shown in FIG. 8, the switching plate TW7 is swingable with respect to the fixing plate TW1.

When the switching plate TW7 swings to the state as shown in FIG. 8 from the fixed state as shown in FIG. 7, the first punching hole TW7a corresponding to the normal rotation preventing member TW3 moves along a circumferential direction from a position corresponding to the normal rotation preventing member TW3. Therefore, the normal rotation preventing member TW3 is pushed by the switching plate TW7, and overcomes a force applied by the first spring TW5 to be contained into the first containing part TW1b (referring to FIG. 6). Therefore, the engagement between the swing end part TW3a of the normal rotation preventing member TW3 and the first engagement part TW2d is prevented. Therefore, the rotation of the rotating plate to a normal rotation side is allowed.

On the other aspect, when the switching plate TW7 swings to the state as shown in FIG. 8 from the fixed state as shown in FIG. 7, the second punching hole TW7b corresponding to the reverse rotation preventing member TW4 is still located in the position corresponding to the reverse rotation preventing member TW4. Therefore, the reverse rotation preventing member TW4 will not be pushed by the switching plate TW7 and is protruded from the second containing part TW1c by a force applied from the second spring TW4 (referring to FIG. 5). Therefore, the swing end part TW4a of the reverse rotation preventing member TW4 and the second engagement part TW2e are engaged. Therefore, the rotation of the rotating plate TW2 to a reverse rotation side is prevented.

In this way, the state that the rotation of the rotating plate TW2 to the normal rotation side is allowed and the rotation to the reverse rotation side is prevented becomes the reverse rotation preventing state in the bidirectional clutch TW.

Besides, when the switching plate TW7 moves to the normal rotation side from the position as shown by a connecting line of two points in FIG. 8, the second punching hole TW7b corresponding to the reverse rotation preventing member TW4 moves along the circumferential direction from the position corresponding to the reverse rotation preventing member TW4. Therefore, the reverse rotation preventing member TW4 is pushed by the switching plate TW7, and overcomes the force applied by the second spring TW6 to be contained in the second containing part TW1c. Therefore, the engagement between the swing end TW4a of the reverse rotation preventing member TW4 and the second engagement part TW2e is prevented. Therefore, the rotation of the rotating plate TW2 to the reverse rotation side is allowed.

On the other aspect, when the switching plate TW7 further rotates to the normal rotation side from the position as shown by a connecting line of two points in FIG. 8, the first punching hole TW7a corresponding to the normal rotation preventing member TW3 is still located in the position corresponding to the normal rotation preventing member TW3. Therefore, the normal rotation preventing member TW3 will not be pushed by the switching plate TW7, and is protruded from the first containing part TW1b by the force applied from the first spring TW5 (referring to FIG. 5). Therefore, the swing end part TW3a of the normal rotation preventing member TW3 and the first engagement part TW2d are engaged. Therefore, the rotation of the rotating plate TW2 to the normal rotation side is prevented.

In this way, the state that the rotation of the rotating plate TW2 to the reverse rotation side is allowed and the rotation to the normal rotation side is prevented becomes the normal rotation preventing state in the two-way clutch TW.

Next, one example of the switching control mechanism performing the switching of the engagement mechanism according to a signal of the control part ECU is explained with reference to FIGS. 9A and 9B.

Figure 9A:
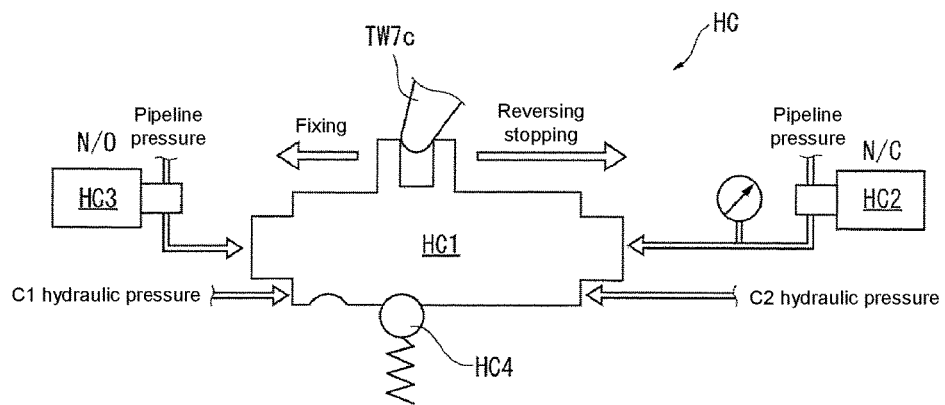
FIGS. 9A and 9B are explanatory drawings of a hydraulic pressure control circuit performing switching of the two-way clutch of the automatic transmission of FIG. 1.
Figure 9B:
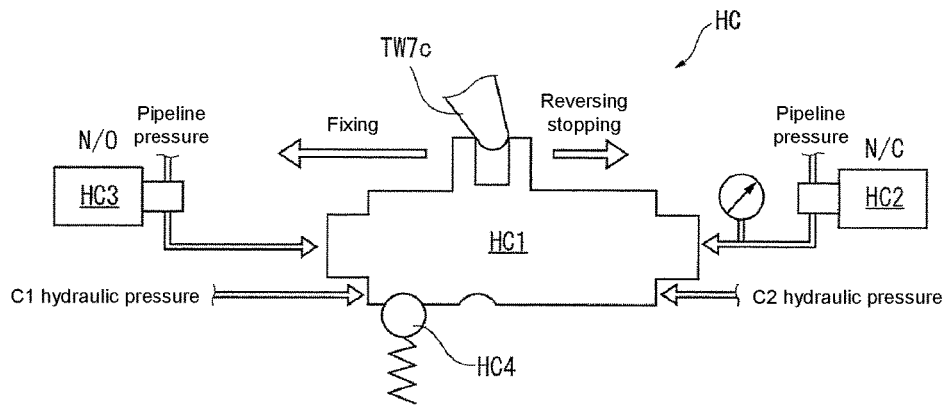

As shown in FIGS. 9A and 9B, the hydraulic pressure control circuit HC has a slider HC1 engaged with the protrusion TW7c disposed on the switching plate TW7. When the slider HC1 is located on the right side of the FIGS. 9A and 9B, the two-way clutch TW is switched to the reverse rotation preventing state, and when the slider HC1 is located on the left side of the FIGS. 9A and 9B, the two-way clutch TW is switched to the fixed state.

On the right side of the drawing of the slider HC1, pressure is freely supplied to a pipeline through a first opening closing valve HC2 including a solenoid valve. On the left side of the drawing of the slider HC1, pressure is freely supplied to the pipeline through a second opening closing valve HC3 including a solenoid valve. The first opening closing valve HC2 is a normally close mode and the second opening closing valve HC3 is an normally open mode.

The first opening closing valve HC2 and the second opening closing valve HC3 are opened and closed according to a signal from the control part ECU. That is, the two-way clutch TW is controlled by the control part ECU through the hydraulic pressure control circuit HC.

Besides, on the right side of the drawing of the slider HC1, a hydraulic pressure is freely supplied to the second clutch C2 on a plane different from the plane where the pipeline pressure is received. On the left side of the drawing of the slider HC1, a hydraulic pressure is freely supplied to the first clutch C1 on a plane different from the plane where the pipeline pressure is received. The hydraulic pressure supplied to the slider C1 and the second clutch C2 by the slider HC1 is used as a RVS prepare pressure.

Besides, a detent mechanism HC4 is disposed in the slider HC1, such that if the pipeline pressure exceeds a prescribed pressure, then there is no switching between the fixed state as shown in FIG. 9A and the reverse rotation preventing state as shown in FIG. 9B.

According to the hydraulic pressure control circuit HC, by setting the first opening closing valve HC2 to be open and setting the second opening closing valve HC3 to be closed, and setting the pipeline pressure to be more than a prescribed hydraulic set based on a pressure difference between the hydraulic pressures of the first clutch C1 and the second clutch C2 and an engagement force of the detent mechanism HC4, such that the slider HC1 moves to a left side, and the two-way clutch is switched to a fixed state.

Oppositely, by setting the first opening closing valve HC2 to be closed and the second opening closing valve to open and setting the pipeline pressure to be more than the switching hydraulic pressure, such that the slider HC1 moves to the right side of the drawing and the two-way clutch TW is switched to a reverse rotation preventing state.

Next, the control (fault member judgment control) performed when the control part ECU of the automatic transmission TM judges a fault of the first brake B1 (switching mechanism) as the two-way clutch TW is explained in detail with reference to FIGS. 1, 8-13A and 13B.

As shown in FIG. 1, the vehicle carrying the automatic transmission TM includes: a shift lever SL, freely switching a shifting position (gear position) to any one of a advancing gear, a neutral range and a reverse gear; an accelerator opening detector 4, detecting ON/OFF of an accelerator pedal AP; and a drive source rotational speed detector 6, detecting a rotational speed of a drive source ENG.

Besides, the automatic transmission TM includes: an input rotational speed detector 7, detecting the rotational speed of the input shaft 2; an output rotational speed detector 8, detecting a rotational speed of the output gear 3; a temperature detector 9, recognizing a temperature of the third clutch C3 (decoupling mechanism); and a hydraulic pressure control circuit HC, performing switching between the first brake B1 and the third brake C3 according to an indication from the control part ECU.

The hydraulic pressure control circuit HC includes: a hydraulic pressure detector HC5, detecting a hydraulic pressure supplied to the third clutch C3 from the hydraulic pressure control circuit HC; a hydraulic adjusting part HC6, including a hydraulic adjusting valve, the hydraulic adjusting valve freely adjusting the hydraulic pressure of the hydraulic pressure control circuit HC based on information from the control part ECU; and a stroke sensor HC7, used for recognizing the position of the slider HC1 (referring to FIGS. 9A and 9B).

The control part ECU has: an actual change gear ratio calculating part 10, calculating an actual change gear ratio based on a rotational speed of the input shaft 2 and a rotational speed of the output gear 3; and a fault judging part 11, used for judging a fault of the two-way clutch TW.

The actual change gear ratio calculating part 10 receives rotation information of the input shaft 2 of the input rotational speed detector 7 and rotational speed information from the output gear 3 of the rotational speed detector 8.

The fault judging part 11 receives shifting position information from the shifting lever SL, the ON/OFF information from the accelerator pedal of the accelerator opening detector 4, rotation information from the drive source ENG of the drive source rotational speed detector 6, temperature information from the third clutch C3 of the temperature detector 9, hydraulic information from the hydraulic pressure detector HC5 and position information from the slider HC1 of the stroke sensor HC7.

In the automatic transmission TM constituted in such manner, when the two-way clutch TW as the first brake B1 (switching mechanism) appears to have a fault due to a reason of acute deceleration or a reason that the temperature of the third clutch C3 detected by the temperature detector 9 reaches a high temperature and the like, the fault judging part 11 of the control part ECU judges whether the fault is generated by first judgment and second judgment explained below.

Figure 10:
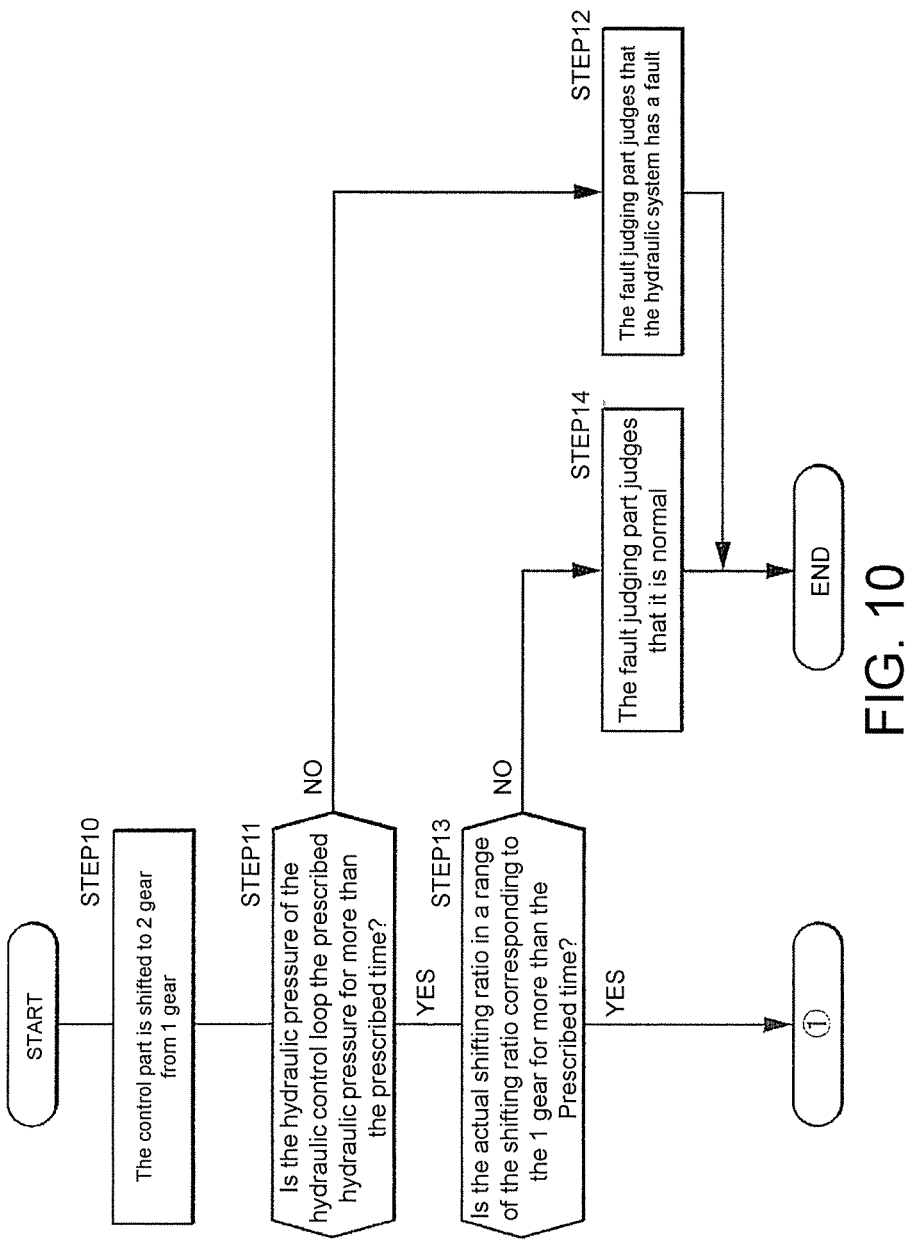
FIG. 10 is a flow chart of processing performed in first judgment of fault judgment performed by a fault judging part of the automatic transmission of FIG. 1.

As shown by the flow chart of FIG. 10, in the first judgment, at first, the control part ECU performs the control of shifting a gear position to the 2 gear from the 1 gear (FIG. 10/step (STEP) 10).

Specifically speaking, the hydraulic pressure control circuit HC keeps the reverse rotation preventing state of the first brake B1 (switching mechanism) as the two-way clutch TW in order to shift to the 2 gear from the 1 gear according to the indication from the control part ECU, and sets the third clutch C3 (decoupling mechanism) into a coupled state (referring to FIG. 4).

In addition, in order to shift the 1 gear to the 2 gear, the automatic transmission TW must change the state of the third clutch C3 to the coupled state (with reference to the nomogram of FIG. 3 and "1st" and "2nd" of FIG. 4) expect for changing the rotation of the gear carrier Cd (eleventh element) corresponding to the first brake B1 as the two-way clutch to the rotation state from the state of preventing the rotation. In addition, in the automatic transmission TM, when the gear position is changed to the 2 gear from the 1 gear, the states of other engagement mechanisms except for the third clutch C3 are not changed.

In the automatic transmission TM constituted in such manner, if although the gear position has been changed to the 2 gear (second gear position) from the 1 gear (first gear position), the change gear ratio is still kept to be the change gear ratio corresponding to the 1 gear (that is, when the change gear ratio corresponding to the 1 gear is the prescribed time longer than the full time required for full shifting), then the possibility that the third clutch C3 or first brake B1 has a fault exists.

Besides, the different from the first brake B1 as the two-way clutch TW, the third clutch C3 must keep a prescribed hydraulic pressure corresponding to the coupled state in the hydraulic pressure control circuit HC in which the third clutch C3 is controlled to be switched in order to keep the coupled state.

Therefore, if although the hydraulic pressure is kept to be the hydraulic pressure (short for "prescribed pressure" hereinafter) causing the third clutch C3 to correspond to the coupled state for more than the prescribed time, the actual change gear ratio is still kept to be the change gear ratio corresponding to the 1 gear, then it's a state that the decoupling mechanism is normally fastened and the possibility that the switching mechanism has a fault is high.

Therefore, in first judgment, next, the fault judging part 11 judges whether the hydraulic pressure of the hydraulic pressure control circuit HC of the third clutch C3 is the prescribed hydraulic pressure for more than the prescribed time (FIG. 10/step 11).

Specifically speaking, the fault judging part 11 judges whether the hydraulic pressure of the hydraulic pressure control circuit HC switching the third clutch C3 is the hydraulic pressure for prescribed time based on a signal from the hydraulic pressure detector HC5.

Besides, if the hydraulic pressure of the hydraulic pressure control circuit HC is not the prescribed hydraulic pressure for the prescribed time (NO in step 11), then in the first judgment, next, the fault judging part 11 judges that the hydraulic system has a fault, and ends the processing (FIG. 10/step 12).

On the other aspect, if the hydraulic pressure of the hydraulic pressure control circuit HC is the prescribed hydraulic pressure for more than the prescribed time (YES in step 11), in first judgment, next, the fault judging part 11 judges whether the actual change gear ratio in the range of the change gear ratio corresponding to the 1 gear is more than the prescribed time (FIG. 10/step 13).

Specifically speaking, in the prescribed time, the actual change gear ratio calculating part 10 calculates the actual change gear ratio based on signals from the input rotational speed detector 7 and the output rotational speed detector 8, and the fault judging part 11 compares the calculated actual change gear ratio with the change gear ratio corresponding to the 1 gear obtained in advance, so as to periodically repeatedly judge whether the actual change gear ratio is in the range of the change gear ratio corresponding to the 1 gear.

Figure 12:
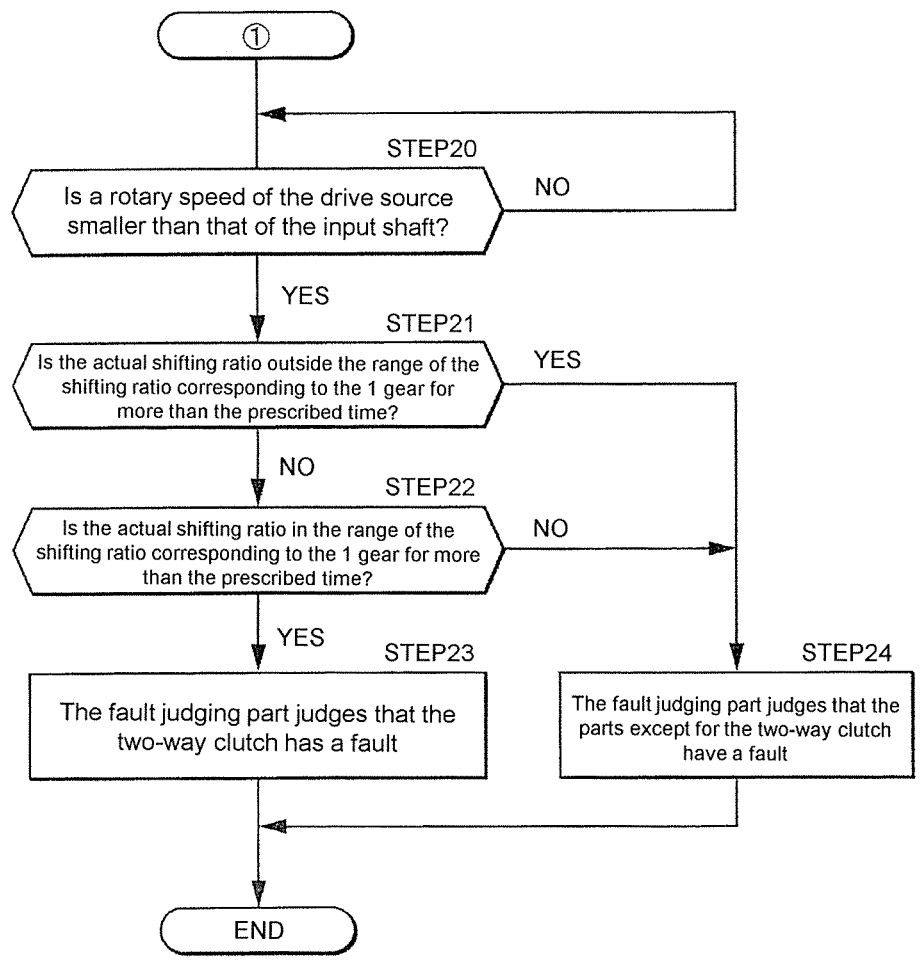
FIG. 12 is a flow chart of processing performed in second judgment of a variable of fault judgment performed by a fault judging part of the automatic transmission of FIG. 1.

Besides, if the actual change gear ratio in the range of the change gear ratio corresponding to the 1 gear is more than the prescribed time (YES in step 13), then the possibility that the first brake B1 as the two-way clutch TW has a fault is high and the second judgment as shown in FIG. 12 is to be performed.

On the other aspect, if the actual change gear ratio is not the change gear ratio corresponding to the 1 gear for more than the prescribed time (NO in step 13), then the fault judging part 13 judges that there is no faults and it is normal and ends the processing (FIG. 10/step 14).

Besides, if whether it's such state is detected before the fault judgment of the switching mechanism, then whether the part having the fault is the switching mechanism can be easily learned.

In addition, the first judgment is not limited to the mentioned procedure and can be performed by other procedures. For example, the first judgment can be performed by the variable examples explained as follows.

The third clutch C3 of the automatic transmission TM is different from the first brake B1 as the two-way clutch TW, and if the coupled state is kept, then heat is generated by mutual friction of a friction member (disk), therefore, the temperature higher than the prescribed temperature corresponding to the state is kept.

Therefore, if although the temperature is the temperature corresponding to the coupled state of the third clutch C3 (short for "prescribed temperature" hereinafter) for more than the prescribed time, the actual change gear ratio is still kept to be the change gear ratio corresponding to the 1 gear, then it's a state that the third clutch C3 is normally fastened and the possibility that the brake B1 has a fault is high.

Figure 11:
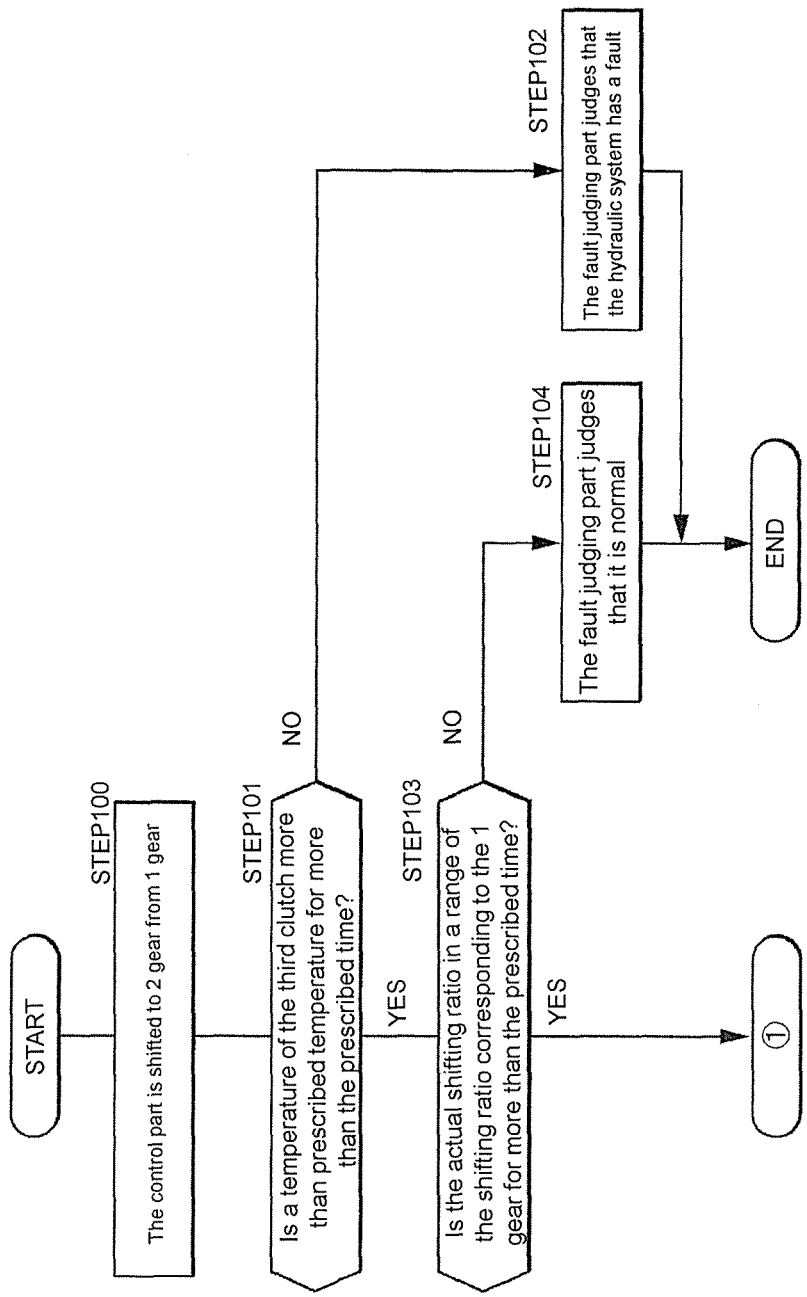
FIG. 11 is a flow chart of processing performed in first judgment of a variable of fault judgment performed by a fault judging part of the automatic transmission of FIG. 1.

Therefore, in the first judgment of the variable example, as shown by the flow in FIG. 11, at first, the control part ECU performs the control of shifting from the 1 gear to the 2 gear (FIG. 11/step 100).

Next, in the first judgment of the variable example, the fault judging part 11 judges whether the temperature of the third clutch C3 is more than the prescribed temperature for more than the prescribed time (FIG. 11/step 101).

Besides, if the temperature of the third clutch C3 is not more than the prescribed temperature for more than the prescribed time (no in step 101), then in the first judgment of the variable example, next, the fault judging part 11 judges that the hydraulic system has a fault, and ends the processing (FIG. 11/step 102).

On the other aspect, if the temperature of the third clutch C3 is more than the prescribed temperature for more than the prescribed time (yes in step 101), then in the first judgment of the variable example, next, the fault judging part 11 judges whether the actual change gear ratio in the range of the shifting range corresponding to the 1 gear is more than the prescribed time (FIG. 11/step 103).

Besides, if the actual change gear ratio in the range of the change gear ratio corresponding to the 1 gear is more than the prescribed time (yes in step 103), then the possibility that the first brake B1 as the two-way clutch TW has a fault is high, therefore, the second judgment as shown in FIG. 12 is to be performed.

On the other aspect, if the actual change gear ratio is not the change gear ratio corresponding to the 1 gear for more than the prescribed time (no in step 103), then the fault judging part judges that there is no faults and it is normal and ends the processing (FIG. 11/step 104).

Besides, in the procedure of shifting in the first judgment (FIG. 10/step 10 and FIG. 11/step 100), as long as the first gear position that the switching mechanism is in the fixed state and the decoupled state is in the coupled state or fixed state is shifted to the second gear position that the switching mechanism is in the reverse rotation preventing state and the decoupling mechanism is in the released state. Therefore, as abovementioned, for the gear positions in the procedure of shifting, it is unnecessary that the first gear position is the 1 gear and the second gear position is the 2 gear, and the first gear position and the second gear position can be other gear positions in the automatic transmission of different structures.

Like the flow chart as shown in FIG. 12, in the second judgment, at first, the fault judging part judges that whether the rotational speed of the drive source ENG is smaller than that of the input shaft 2 (FIG. 12/step 20).

In the automatic transmission, the drive force of the drive source ENG is transmitted to the input shaft 2 through a torque converter TC, therefore, a time lag exists till the rotational speed of the input shaft 2 and that of the drive source ENG are consistent, and sometimes, the rotational speed of the input shaft 2 and that of the drive source ENG are inconsistent. For example, under the state that the rotational speed of the drive source ENG is reduced due to a reason that the accelerator pedal AP is closed and the like, the rotational speed of the drive source ENG is lower than that of the input shaft 2.

Therefore, if the rotational speed of the drive source ENG is smaller than that of the input shaft 2 (yes in step 20), then it can be said that it is in the state that the rotation sped of the drive source NEG is reduced. Besides, under such condition, the step 21 is to be performed.

On the other aspect, if the rotational speed of the drive source ENG is not smaller than that of the input shaft 2 (no in step 20), then the control part ECU repeatedly judges till the rotational speed of the drive source ENG is smaller than that of the input shaft 2. In addition, under such condition, repeated judgment may be not required, the control of reducing the rotational speed of the drive source ENG can be compulsorily performed, such that the rotational speed of the drive source ENG is smaller than that of the input shaft 2.

In addition, since the second judgment is performed after the first judgment, in the stage of the step 20 of the second judgment, the procedure of shifting in the first judgment has been performed (FIG. 10/step 10 and FIG. 11/step 100). That is, it is in the state that the control part ECU recognizes that the two-way clutch TW has been switched to the reverse rotation preventing state.

Therefore, if the rotational speed of the drive source ENG is smaller than that of the input shaft 2 (yes in step 20), then it can be said that under the state that the control part ECU recognizes that the two-way clutch TW has been switched to the reverse rotation preventing state, the rotational speed of the drive source ENG is to be reduced.

Herein, the actual change gear ratio during reduction of the rotational speed of the drive source ENG under the state that the control part ECU recognizes that the two-way clutch switched to the reverse rotation preventing state is explained with reference to FIGS. 13A and 13B.

If the switching mechanism does not generate a fault, then under the state that the control part ECU recognizes that the two-way clutch TW has been switched to the reverse rotation preventing state, the switching of the two-way clutch TW is set into the reverse rotation preventing state is normally performed, such that the two-way clutch TW is switched to the reverse rotation preventing state.

Besides, if the rotational speed of the drive source ENG is reduced under such state, then the rotational speed corresponding to the drive source ENG is reduced, the rotation sped of the input shaft (that is, the rotational speed of the sun gear Sd (twelfth element)) is also reduced. At this point, since the two-way clutch TW is in the reverse rotation preventing state (that is, the normal rotation of the gear carrier Cd (eleventh element) corresponding to the two-way clutch TW is allowed), the rotational speed of the gear carrier Cd (eleventh element) can be increased corresponding to the rotational speed of the input shaft 2. As a result, the rotational speed of the output gear 3 (that is, the rotational speed of the inner ring gear Rd (tenth element)) and the rotational speed of the input shaft 2 (that is, the rotational speed of the sun gear Sd (twelfth element)) are not changed in a linkage manner.

Figure 13A:
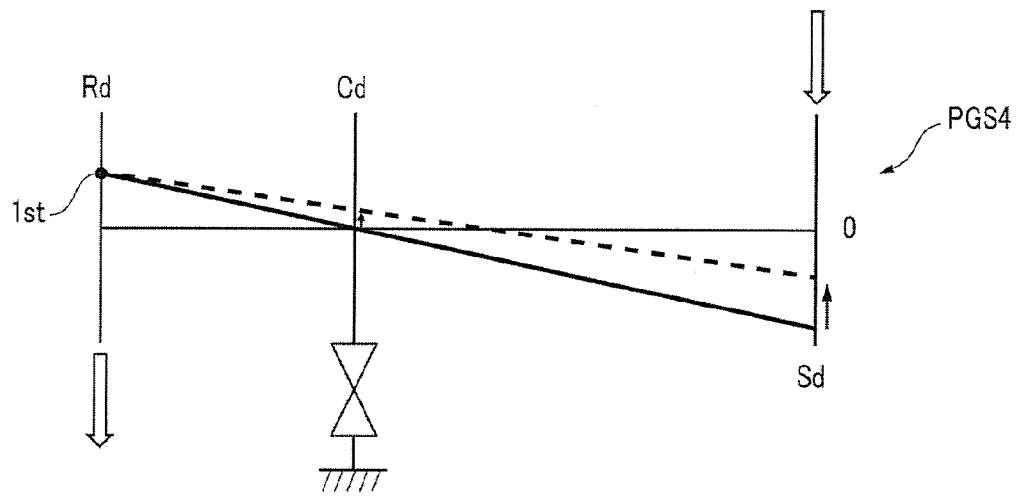
FIGS. 13A and 13B are nomograms during second judgment of a planetary gear mechanism corresponding to the two-way clutch of the automatic transmission of FIG. 1.

Specifically speaking, as shown in FIG. 13A, the rotational speed relation of the three elements is changed to the relation as shown in by a virtual line from the relation as shown by a full line. That is, if the two-way clutch does not generate a fault, then the rotational speed of the output gear 3 relative to the rotational speed of the input shaft 2 (that is, the actual change gear ratio) is changed from the change gear ratio prior to the reduction of the rotational speed of the drive source ENG.

Therefore, under the state that the control part ECU recognizes that the two-way clutch has been switched to the reverse rotation preventing state, if the actual change gear ratio is changed when the rotational speed of the drive source ENG is reduced, then it can be judged that the two-way clutch is normally switched and the does not generate a fault.

On the other aspect, if the two-way clutch TW generates a fault, then under the state that the control part ECU recognizes that the two-way clutch has been switched to the reverse rotation preventing state, the switching of the two-way clutch to the reverse rotation preventing state cannot be performed normally, and the two-way clutch TW is still kept in the fixed state.

Besides, if the rotational speed of the drive source ENG is reduced under such state, then the rotational speed corresponding to the drive source ENG is reduced, and the rotational speed of the input shaft 2 (that is, the rotational speed of the sun gear Sd (twelfth element)) is also reduced. At this point, since the two-way clutch TW is kept to be the fixed state, the rotational speed of the gear carrier Cd (eleventh element) corresponding to the two-way clutch TW is still kept to be "0". As a result, the rotational speed of the output gear 3 (that is, the rotational speed of the inner ring gear Rd (tenth element)) and the rotational speed of the input shaft 2 are reduced in a linkage manner.

Figure 13B:
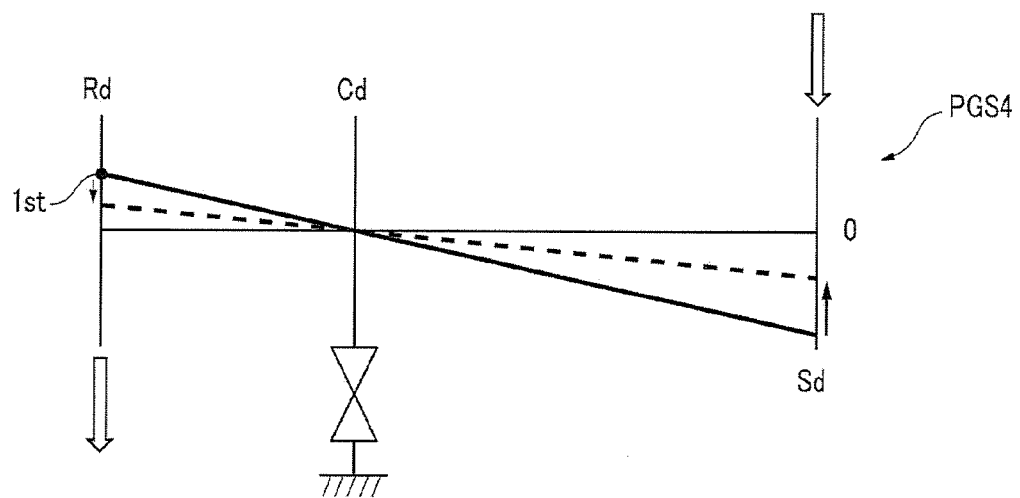

Specifically speaking, as shown in FIG. 13B, a rotational speed relation of the three elements is changed to the relation shown by the virtual line from the relation shown by the full line. That is, if the two-way clutch TW has a fault, then the rotational speed of the output gear 3 relative to the rotational speed of the input shaft 2 (that is, the actual change gear ratio) is not changed from the change gear ratio prior to the reduction of the rotational speed of the drive source ENG.

Therefore, under the state that the control part ECU recognizes that the two-way clutch TW has been switched to the reverse rotation preventing state, if the actual change gear ratio is not changed when the rotational speed of the drive source ENG is reduced, then it can be judged that two-way clutch cannot be normally switched and the two-way clutch TW generates a fault.

In addition, since the second judgment is performed after the first judgment, therefore, at the beginning moment of the second judgment, the control part ECU recognizes that the two-way clutch TW has been switched to the reverse rotation preventing state. Specifically speaking, the control part ECU recognizes that the hydraulic pressure of the hydraulic pressure control circuit HC controlling the switching of the two-way clutch TW is normal. That is, the slider HC1 of the hydraulic pressure control circuit HC is located in a position corresponding to the reverse rotation preventing state (referring to FIG. 9B).

Therefore, when the control part ECU recognizes that the two-way clutch TW has been switched to the reverse rotation preventing state, it can be said that the possibility that the hydraulic pressure control circuit HC has a fault is high. That is, it can be said that the possibility that the two-way clutch TW has a fault is high.

In addition, as a fault of the two-way clutch TW, for example, a condition that the protrusion TW7c engaged with the slider HC1 of the hydraulic pressure control circuit HC is broken or bent is considered.

Next, in the second judgment, the fault judging part 11 judges whether the actual change gear ratio in the range of the change gear ratio corresponding to the 1 gear is more than the prescribed time (FIG. 12/step 12).

If the actual change gear ratio in the range of the change gear ratio corresponding to the 1 gear is not more than the prescribed time (no in step 21), then in second judgment, next, the fault judging part 11 judges whether the actual change gear ratio in the range of the change gear ratio corresponding to the 1 gear is more than the prescribed time (FIG. 12/step 22).

If the actual change gear ratio in the range of the change gear ratio corresponding to the 1 gear is more than the prescribed time (yes in step 22), then the fault judging part 11 judges that the two-way clutch TW has a fault, and ends the processing (FIG. 12/step 23).

On the other aspect, if the actual change gear ratio is outside the range of the change gear ratio corresponding to the 1 gear (yes in step 21), or the actual change gear ratio in the range of the change gear ratio corresponding to the 1 gear is not more than the prescribed time (no in step 22), then the fault judging part 11 judges that the two-way clutch TE has a fault, and ends the processing (FIG. 12/step 24).

In addition, if the actual change gear ratio outside the range of the change gear ratio corresponding to the 1 gear is more than the prescribed time (yes in step 21), then the two-way clutch TW judges a state that the fault occurs possibly, therefore, the processing of judging the fault of the two-way clutch TW can be ended immediately. Therefore, step 21 can be omitted.

As abovementioned, in the automatic transmission TM, by controlling judgment of the fault member, whether the two-way clutch TW or other members have a fault can be judged.

Besides, the fault member judges that the control is same as that normally performed by the control part ECU during shifting of the gear position. Further, based on the judgment of the judging control result of the fault member, usually, it is performed based on values detected by the input rotational speed detector 7 and, the output rotational speed detector 8 disposed in the automatic transmission. That is, there is no need to dispose a new sensor in order to perform judging control of the fault member and judgment based on the judging control result of the fault member (for example, a switch sensor for the normal rotation preventing member TW3), therefore, a manufacture cost is not increased.

Therefore, according to the automatic transmission TM, the condition that the fault is the two-way clutch or other members except for the two-way clutch can be properly judged without increasing the manufacture cost.

The above explains the illustrated embodiments, but the present invention is not limited to such form.

For example, in the embodiment, the first judgment is performed before the second judgment. It is intended to easily master whether the part has a fault is the two-way clutch TW or not. Therefore, in the automatic transmission of the present invention, the first judgment can be omitted and the second judgment is only used to perform the fault judging of the two-way clutch. However, under such case, the procedure like the procedure (FIG. 10/step 10 and FIG. 11/step 100) for shifting in the first judgment and used for setting the state in which the control part recognizes the switching mechanism has been switched to the reverse rotation preventing state must be performed before the second judgment is begin.

Besides, in the embodiment, the automatic transmission TM is able to be shifted to 10 gears. But, as the automatic transmission of the present invention, any automatic transmission can be used as long as it is able to be shifted to a plurality of gear positions.

Besides, in the embodiment, the condition of switching the shifting position by using the shift lever is explained. But, the switching method of the shifting position is not limited thereto. For example, the constitution can also be that the shifting position is switched by press of a button. For example, the constitution can be that the selected shifting position can be judged according to a press signal of the button.

Besides, in the embodiment, as the switching mechanism, the first brake B1 as the two-way clutch switched by using the hydraulic pressure control circuit HC is explained. But, the switching mechanism of the present invention is not limited thereto. For example, an electromagnetic actuator instead of the hydraulic pressure control circuit can be used to switch the two-way clutch between the fixed state and the reverse rotation preventing state.

What is claimed is:

1. An automatic transmission, comprising:
   an input member disposed inside a casing and rotated by a driving force transmitted from a drive source;
   a planetary gear mechanism having a plurality of elements rotatable inside the casing;
   a plurality of engagement mechanisms switchable to a coupled state in which the elements are coupled to one another, or switchable to a fixed state in which the elements are fixed to the casing, comprising
      a switching mechanism switchable between the fixed state and a reverse rotation preventing state that allows a normal rotation and prevents a reverse rotation of corresponding elements among the plurality of elements;
   an output member outputting a rotation; and
   a control part controlling the engagement mechanisms and recognizing a rotational speed of the drive source, wherein
   the automatic transmission is configured to output a rotation of the input member to the output member while changing speed in a plurality of gear positions with the planetary gear mechanism and the engagement mechanisms, and the automatic transmission comprises:
   an input rotational speed detector detecting a rotational speed of the input member; and
   an output rotational speed detector detecting a rotational speed of the output member, wherein
   the control part has an actual change gear ratio calculating part and a fault judging part, the actual change gear ratio calculating part calculates an actual change gear ratio based on the rotational speed of the input member and the rotational speed of the output member, the fault judging part judges faults of the switching mechanism, and
   under a condition that the control part recognizes that the switching mechanism has been switched to the reverse rotation preventing state, in response to the actual change gear ratio is kept to be a change gear ratio prior to a reduction of the rotational speed of the drive source when the rotational speed of the drive source is reduced, the fault judging part judges that the switching mechanism has a fault.

2. The automatic transmission according to claim 1, wherein the plurality of engagement mechanisms comprise a decoupling mechanism, the decoupling mechanism is switchable between the coupled state or fixed state of the corresponding elements among the plurality of elements and a released state of releasing the coupled state or fixed state,
   the automatic transmission comprises a hydraulic pressure control circuit switching the decoupling mechanism according to a provided hydraulic pressure,
   the hydraulic pressure control circuit has a hydraulic pressure detector detecting the hydraulic pressure,
   the element corresponding to the switching mechanism is changed to a rotation state from the state of preventing the rotation when a shifting gear is shifted to a second shifting gear from a first shifting gear,
   the decoupling mechanism is switched from the coupled state or the fixed state to the released state or switched from the released state to the coupled state or the fixed state when the shifting gear is shifted to the second shifting gear from the first shifting gear, and
   in response to the hydraulic pressure is kept to be a hydraulic pressure corresponding to another state of the decoupling mechanism for longer than a prescribed time and the actual change gear ratio is kept to be a change gear ratio of the first shifting gear when the shifting gear is shifted to the second shifting gear from the first shifting gear, the fault judging part judges whether the switching mechanism has a fault.

3. The automatic transmission according to claim 2, characterized in that
   the decoupling mechanism comprises a friction engagement mechanism, the friction engagement mechanism is switchable between the coupled state or fixed state of the corresponding elements among the plurality of elements and the released state releasing the coupled state or fixed state,
   the automatic transmission comprises a temperature detector detecting a temperature of the decoupling mechanism,
   in response to the temperature is kept to be a temperature corresponding to another state of the decoupling mechanism for more than the prescribed time and the actual change gear ratio is kept to be the change gear ratio of the first shifting gear when the shifting gear is shifted to the second shifting gear from the first shifting gear, the fault judging part judges whether the switching mechanism has a fault.

4. The automatic transmission according to claim 1, characterized in that
   the plurality of engagement mechanisms comprise a decoupling mechanism comprising a friction engagement mechanism, the friction engagement mechanism is switchable between the coupled state or fixed state of the corresponding elements among the plurality of elements and a released state releasing the coupled state or fixed state,
   the automatic transmission comprises a temperature detector detecting a temperature of the decoupling mechanism,
   the element corresponding to the switching mechanism is changed to the rotation state from the state of preventing the rotation when a shifting gear is shifted to a second shifting gear from a first shifting gear,
   the decoupling mechanism is switched from the coupled state or the fixed state to the released state or switched from the released state to the coupled state or the fixed state when the shifting gear is shifted to the second shifting gear from the first shifting gear, and
   in response to the temperature is kept to be a temperature corresponding to another state of the decoupling mechanism for more than a prescribed time and the actual change gear ratio is kept to be a change gear ratio of the first shifting gear when the shifting gear is shifted to the second shifting gear from the first shifting gear, the fault judging part judges whether the switching mechanism has a fault.

* * * * *